United States Patent
Ishii

(10) Patent No.: US 10,643,312 B2
(45) Date of Patent: May 5, 2020

(54) SMOOTHED IMAGE GENERATING DEVICE, ABNORMALITY DETERMINING DEVICE, AND SMOOTHED IMAGE GENERATING METHOD

(71) Applicant: SHARP KABUSHIKI KAISHA, Sakai, Osaka (JP)

(72) Inventor: Yasushi Ishii, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/215,233

(22) Filed: Dec. 10, 2018

(65) Prior Publication Data

US 2019/0180417 A1   Jun. 13, 2019

(30) Foreign Application Priority Data

Dec. 11, 2017   (JP) .................................. 2017-236899

(51) Int. Cl.

| | |
|---|---|
| *G06K 9/00* | (2006.01) |
| *G06T 5/00* | (2006.01) |
| *G06T 3/40* | (2006.01) |
| *G06T 7/00* | (2017.01) |
| *H04N 5/235* | (2006.01) |
| *H04N 17/00* | (2006.01) |

(52) U.S. Cl.
CPC ................ *G06T 5/002* (2013.01); *G06K 9/00* (2013.01); *G06T 3/40* (2013.01); *G06T 7/0002* (2013.01); *H04N 5/2351* (2013.01); *G06T 2207/20021* (2013.01); *G06T 2207/20024* (2013.01); *G06T 2207/30168* (2013.01); *H04N 17/002* (2013.01)

(58) Field of Classification Search
CPC . G06K 9/00; G06K 9/40; G06T 5/002; G06T 3/40; G06T 7/0002; G06T 2207/20021; G06T 2007/20024; G06T 2007/30168; H04N 5/225; H04N 5/2351; H04N 17/002
USPC .................. 382/169, 274, 167; 348/187, 340
See application file for complete search history.

(56) References Cited

U.S. PATENT DOCUMENTS

| | | | |
|---|---|---|---|
| 7,999,873 B2 * | 8/2011 | Oyama ................ | H04N 5/2254 348/340 |
| 8,965,120 B2 * | 2/2015 | Yamanaka .............. | G06T 5/003 382/167 |

(Continued)

FOREIGN PATENT DOCUMENTS

JP   2006-050356 A   2/2006

*Primary Examiner* — Trang U Tran
(74) *Attorney, Agent, or Firm* — ScienBiziP, P.C.

(57) ABSTRACT

Provided is a smoothed image generating device which is capable of rapidly smoothing brightness information. A smoothed image generating device (1) includes: a reduced-size divided data generating section (11) which generates reduced-size divided data by extracting some of a plurality of regions from divided data, the divided data being obtained by dividing, into the plurality of regions, brightness data obtained by extracting brightness information from imaging data on a subject having uniform brightness; a smoothing processing section (12) which generates smoothed reduced-size divided data by carrying out a smoothing process with respect to the reduced-size divided data; and a smoothed image generating section (13) which generates smoothed image data, which is identical in size to the divided data, by interpolating between a plurality of regions constituting the smoothed reduced-size divided data.

8 Claims, 14 Drawing Sheets

(56) References Cited

U.S. PATENT DOCUMENTS

| | | | |
|---|---|---|---|
| 9,497,355 B2 * | 11/2016 | Hayasaki | H04N 1/4074 |
| 2013/0236095 A1 * | 9/2013 | Hitomi | G06T 5/002 382/167 |

* cited by examiner

FIG. 7

SMOOTHED IMAGE GENERATING DEVICE, ABNORMALITY DETERMINING DEVICE, AND SMOOTHED IMAGE GENERATING METHOD

This Nonprovisional application claims priority under 35 U.S.C. § 119 on Patent Application No. 2017-236899 filed in Japan on Dec. 11, 2017, the entire contents of which are hereby incorporated by reference.

TECHNICAL FIELD

The present invention relates to a smoothed image generating device and the like each for generating smoothed image data, in which brightness is smoothed, from imaging data which an image capturing device has obtained by capturing a subject.

BACKGROUND ART

As a conventional technique, there is known a technique of smoothing brightness or the like by carrying out a specific process with respect to imaging data. For example, Patent Literature 1 discloses an inspecting device which generates an nth-order approximate curve (flattened data) by applying a least squares method to digital original image data.

CITATION LIST

Patent Literature

[Patent Literature 1] Japanese Patent Application Publication, Tokukai, No. 2006-50356 (published on Feb. 16, 2006)

SUMMARY OF INVENTION

Technical Problem

However, the invention disclosed in Patent Literature 1 has the following problem. That is, computation is carried out with respect to the entire digital original image data so as to generate the flattened data. Therefore, a large amount of calculation is carried out, and accordingly it takes time to generate the flattened data.

An aspect of the present invention has been made in view of the above problems, and an object of an aspect of the present invention is to provide a smoothed image generating device capable of rapidly smoothing brightness information.

Solution to Problem

In order to attain the above object, a smoothed image generating device in accordance with an aspect of the present invention is a smoothed image generating device which generates smoothed image data, in which brightness is smoothed, from imaging data which an image capturing device has obtained by capturing a subject having uniform brightness, the smoothed image generating device including: a reduced-size divided data generating section which generates reduced-size divided data by extracting some of a plurality of regions from divided data, the divided data being obtained by dividing, into the plurality of regions, brightness data obtained by extracting brightness information from the imaging data; a smoothing processing section which generates smoothed reduced-size divided data by carrying out a smoothing process with respect to the reduced-size divided data; and a smoothed image generating section which generates smoothed image data, which is identical in size to the divided data, by interpolating between a plurality of regions constituting the smoothed reduced-size divided data.

A smoothed image generating method in accordance with an aspect of the present invention is a smoothed image generating method of generating smoothed image data, in which brightness is smoothed, from imaging data which an image capturing device has obtained by capturing a subject having uniform brightness, the method including: a reduced-size divided data generating step of generating reduced-size divided data by extracting some of a plurality of regions from divided data, the divided data being generated with use of brightness data obtained by extracting brightness information from the imaging data and being constituted by the plurality of regions each of which indicates adjusted brightness; a smoothing processing step of generating smoothed reduced-size divided data, in which entire brightness is smoothed, with use of a smoothing filter which causes a smoothing process to be carried out with respect to the reduced-size divided data; and a smoothed image generating step of generating smoothed image data, which is identical in size to the divided data, by interpolating between a plurality of regions constituting the smoothed reduced-size divided data.

Advantageous Effects of Invention

According to an aspect of the present invention, it is possible to provide a smoothed image generating device which rapidly smooths brightness information.

BRIEF DESCRIPTION OF DRAWINGS

FIG. 7 illustrates a state where a smoothing process illustrated in each of (a) through (c) of FIG. 6 has been carried out. (a) of FIG. 7 illustrates a state where a position of the smoothing filter has been moved rightward by one. (b) of FIG. 7 illustrates a state where the smoothing filter has been moved to the far right.

DESCRIPTION OF EMBODIMENTS

Embodiment 1

The following description will discuss, in detail, Embodiment 1 of the present invention with reference to FIGS. 1 through 11.

(Configuration of Smoothed Image Generating Device)

Figure 1:
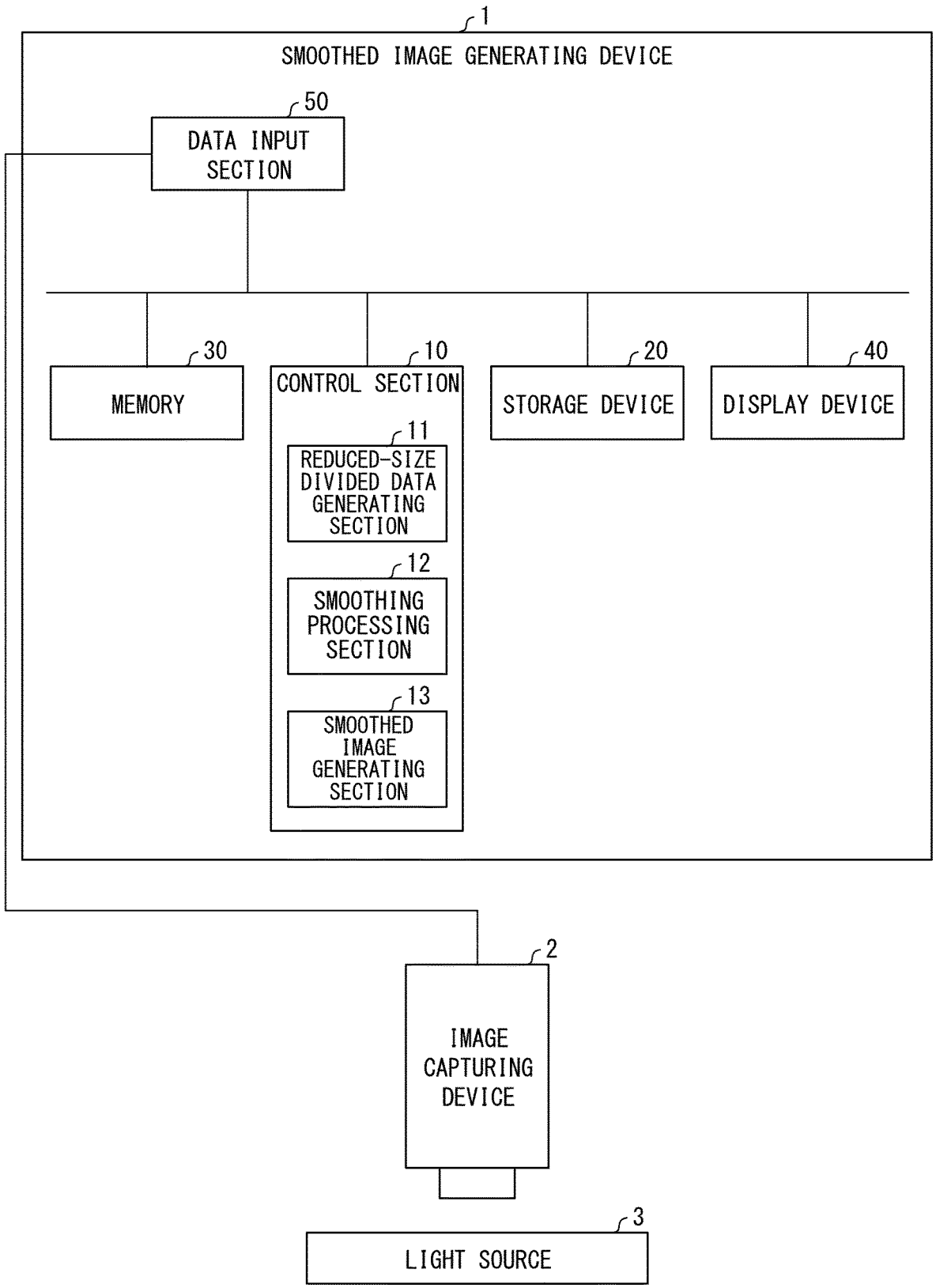
FIG. 1 is a block diagram illustrating an example configuration of a main part of a smoothed image generating device in accordance with Embodiment 1 of the present invention.

A configuration of a smoothed image generating device 1 in accordance with Embodiment 1 will be described below with reference to FIG. 1. FIG. 1 is a block diagram illustrating an example configuration of a main part of the smoothed image generating device 1.

The smoothed image generating device 1 generates smoothed image data, in which brightness is smoothed, from imaging data which an image capturing device 2 has obtained by capturing a light source 3 that is a subject having uniform brightness. According to an example illustrated in FIG. 1, the smoothed image generating device 1 includes a control section 10, a storage device 20, a memory 30, a display device 40, and a data input section 50. The control section 10 includes a reduced-size divided data generating section 11, a smoothing processing section 12, and a smoothed image generating section 13.

The control section 10 integrally controls each section of the smoothed image generating device 1. In a case where the control section 10 receives, via the data input section 50, the imaging data which the image capturing device 2 has obtained by capturing the light source 3, the control section 10 stores the imaging data in the storage device 20. Note that, since shading correction is made to imaging data when a subject is captured, the imaging data generally indicates such brightness distribution that brightness is the highest in the center of an image and is substantially flat but gradually decreases toward a periphery of the image. The control section 10 reads out the imaging data from the storage device 20, loads the imaging data in the memory 30, and generates brightness data (hereinafter, referred to as original brightness data) by extracting brightness information from the imaging data. The control section 10 divides the original brightness data into a plurality of regions (hereinafter, referred to as "a plurality of areas"), and further adjusts brightness indicated by each of the plurality of regions. The control section 10 thus generates divided data (hereinafter, referred to original divided data). Note, here, that each of the plurality of areas can correspond to a plurality of pixels, and the brightness indicated by the each of the plurality of areas can be set to, for example, an average of brightness indicated by the plurality of pixels corresponding to the each of the plurality of areas. Note also that the plurality of areas constituting the original divided data are preferably uniform in size. The control section 10 transmits the original divided data to the reduced-size divided data generating section 11.

In a case where the reduced-size divided data generating section 11 receives the original divided data from the control section 10, the reduced-size divided data generating section 11 generates reduced-size divided data by extracting some of the plurality of areas from the original divided data, and transmits the reduced-size divided data to the smoothing processing section 12. A criteria based on which the reduced-size divided data generating section 11 extracts the some of the plurality of areas from the original divided data so as to generate the reduced-size divided data is not particularly limited. An example will be described with reference to FIGS. 2 and 3.

(Example of Generation of Reduced-Size Divided Data)

Figure 2:
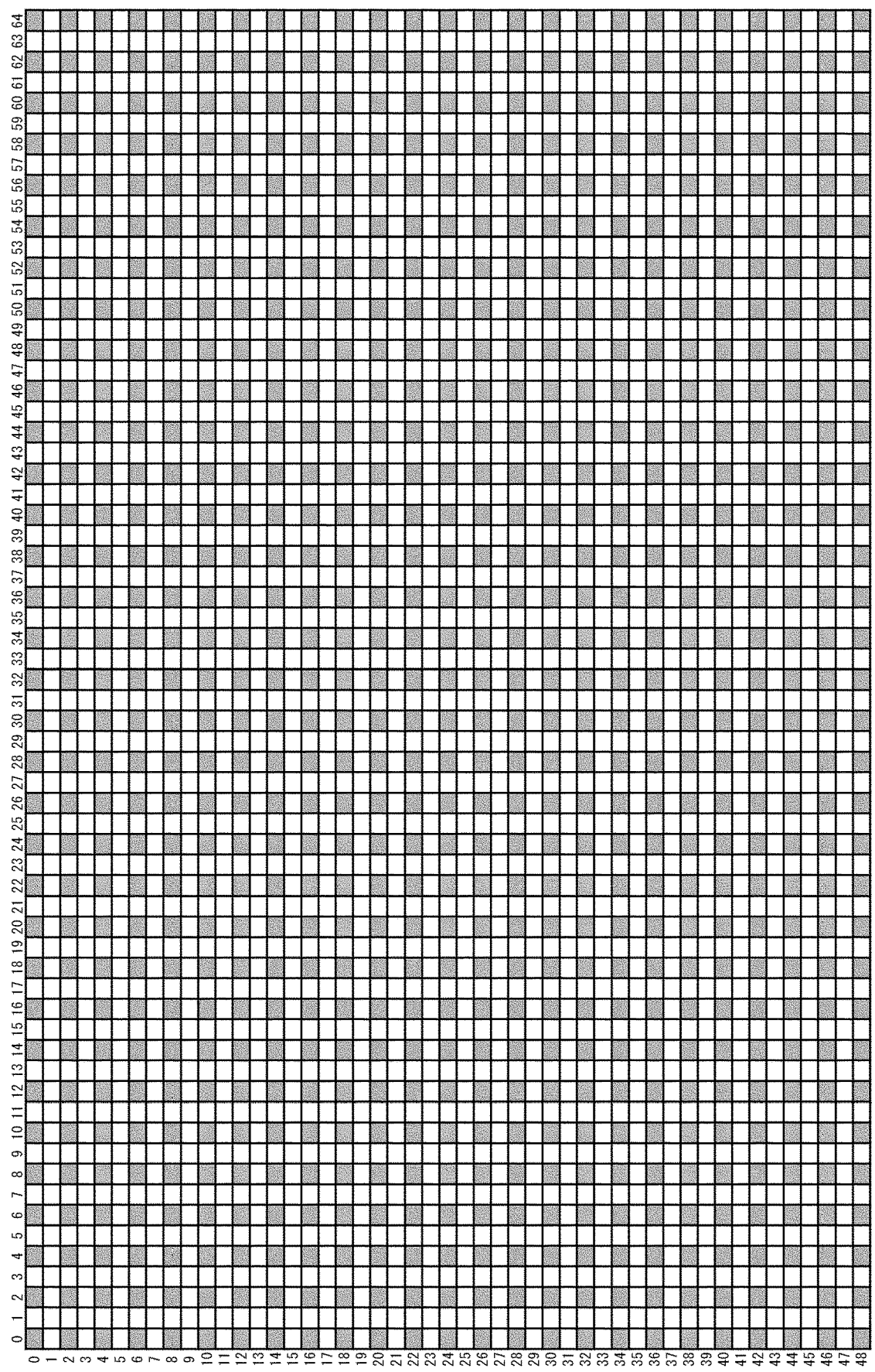
FIG. 2 is a view schematically illustrating areas extracted from original divided data in the smoothed image generating device in accordance with Embodiment 1 of the present invention.

FIG. 2 illustrates, as original divided data, data which is divided into 49×65 areas. Note that it is possible to specify each of the 49×65 areas by, for example, (row number, column number) with use of row numbers 0 to 48 and column numbers 0 to 64. In other words, the original divided data is constituted by 49 rows of areas or 65 columns of areas.

The reduced-size divided data generating section 11 extracts, from the original divided data illustrated in FIG. 2, areas which are colored in FIG. 2. That is, the reduced-size divided data generating section 11 extracts every second area in a horizontal direction and in a vertical direction, out of the 49×65 areas constituting the original divided data, and thereby generates reduced-size divided data.

Figure 3:
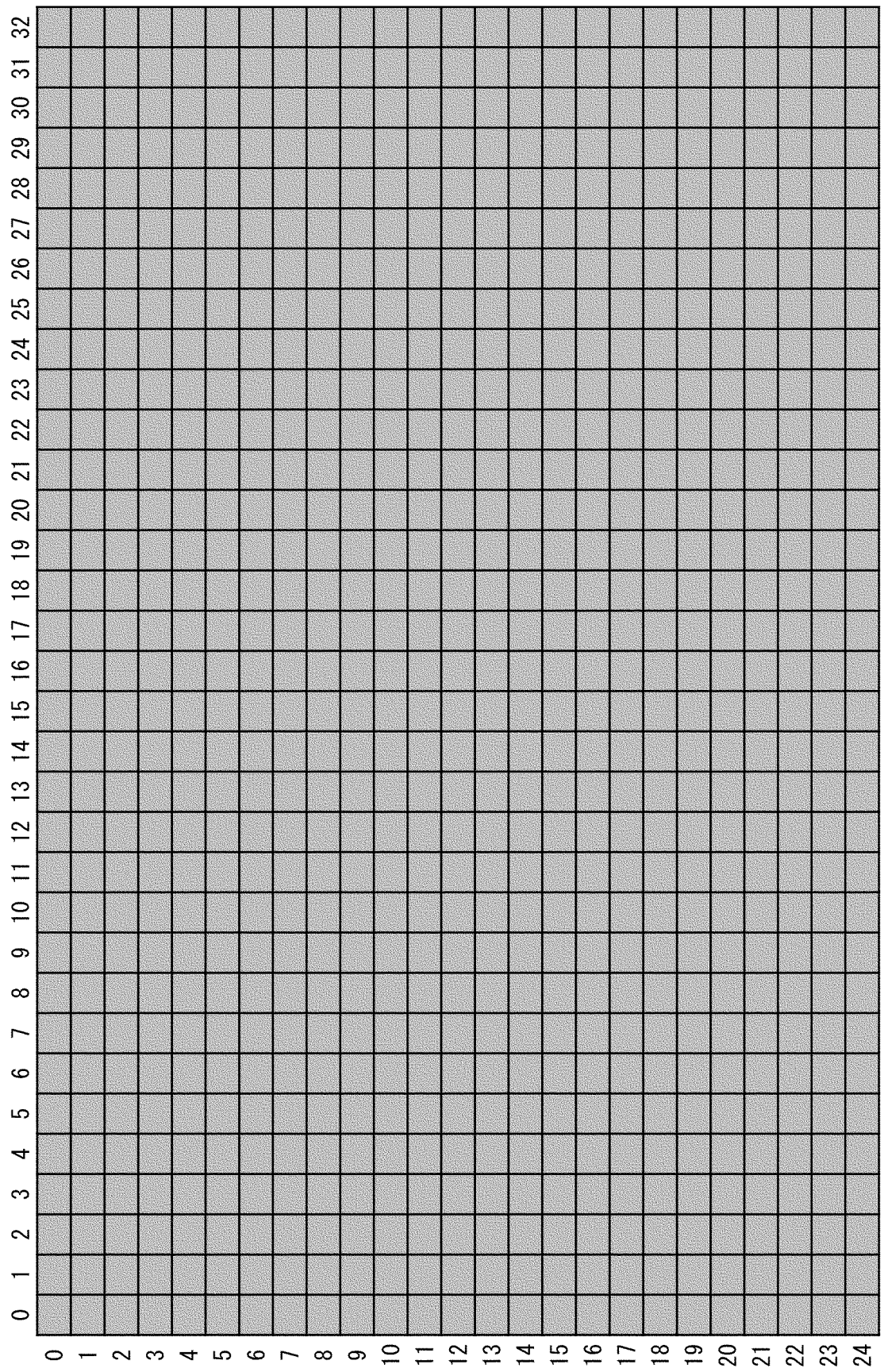
FIG. 3 is a view schematically illustrating reduced-size divided data constituted by the areas extracted from the original divided data illustrated in FIG. 2.

FIG. 3 illustrates the reduced-size divided data which the reduced-size divided data generating section 11 has generated with use of the areas extracted from the original divided data illustrated in FIG. 2. As illustrated in FIG. 3, the reduced-size divided data has 25×33 areas. In a case where the reduced-size divided data generating section 11 generates the reduced-size divided data illustrated in FIG. 3 from the original divided data illustrated in FIG. 2, the reduced-size divided data generating section 11 transmits the reduced-size divided data to the smoothing processing section 12.

The smoothing processing section 12 carries out a smoothing process with respect to the reduced-size divided data received from the reduced-size divided data generating section 11, and thereby generates smoothed reduced-size divided data. The smoothing process will be later described in detail. The smoothing processing section 12 transmits the smoothed reduced-size divided data to the smoothed image generating section 13.

The smoothed image generating section 13 expands the smoothed reduced-size divided data received from the smoothing processing section 12, and thereby generates data identical in size to the original divided data. In so doing, blank areas are set between expanded areas. The smoothed image generating section 13 then carries out an interpolating process with respect to the data thus generated, and thereby further generates smoothed divided data (smoothed image data) identical in size to the original divided data. Expansion of the smoothed reduced-size divided data and the interpolating process will be later described in detail.

The storage device 20 stores therein various kinds of information handled by the smoothed image generating device 1. The memory 30 is a temporary storage device, and data is transmitted between the memory 30 and the storage device 20. The data read out to the memory 30 is processed by the control section 10 and the like, and is then written in the storage device 20 so as to be stored for a long time period.

The display device 40 is, for example, a display which displays the various kinds of information handled by the smoothed image generating device 1. For example, the display device 40 can display the imaging data and the like which the image capturing device 2 has obtained by capturing the light source 3. The display device 40 can display data such as the smoothed divided data. According to the example illustrated in FIG. 1, the smoothed image generating device 1 includes the display device 40. However, the smoothed image generating device 1 is not limited to such a configuration. For example, the smoothed image generating device 1 can be configured so as to cause an external display device 40 to display the various kinds of information.

The data input section 50 receives the imaging data which the image capturing device 2 has obtained. For example, the data input section 50 receives, from the image capturing device 2, the imaging data which the image capturing device 2 has obtained by capturing the light source 3.

The image capturing device 2 is, for example, a digital camera capable of capturing the light source 3. The image capturing device 2 transmits, to the data input section 50, the imaging data which the image capturing device 2 has obtained by capturing the light source 3. The light source 3 is a subject having uniform brightness, and is, for example, a white LED panel.

(Details of Smoothing Process)

An example smoothing process which is carried out by the smoothing processing section 12 in the smoothed image generating device 1 in accordance with Embodiment 1 will be described below with reference to FIGS. 4 to 7.

Figure 4:
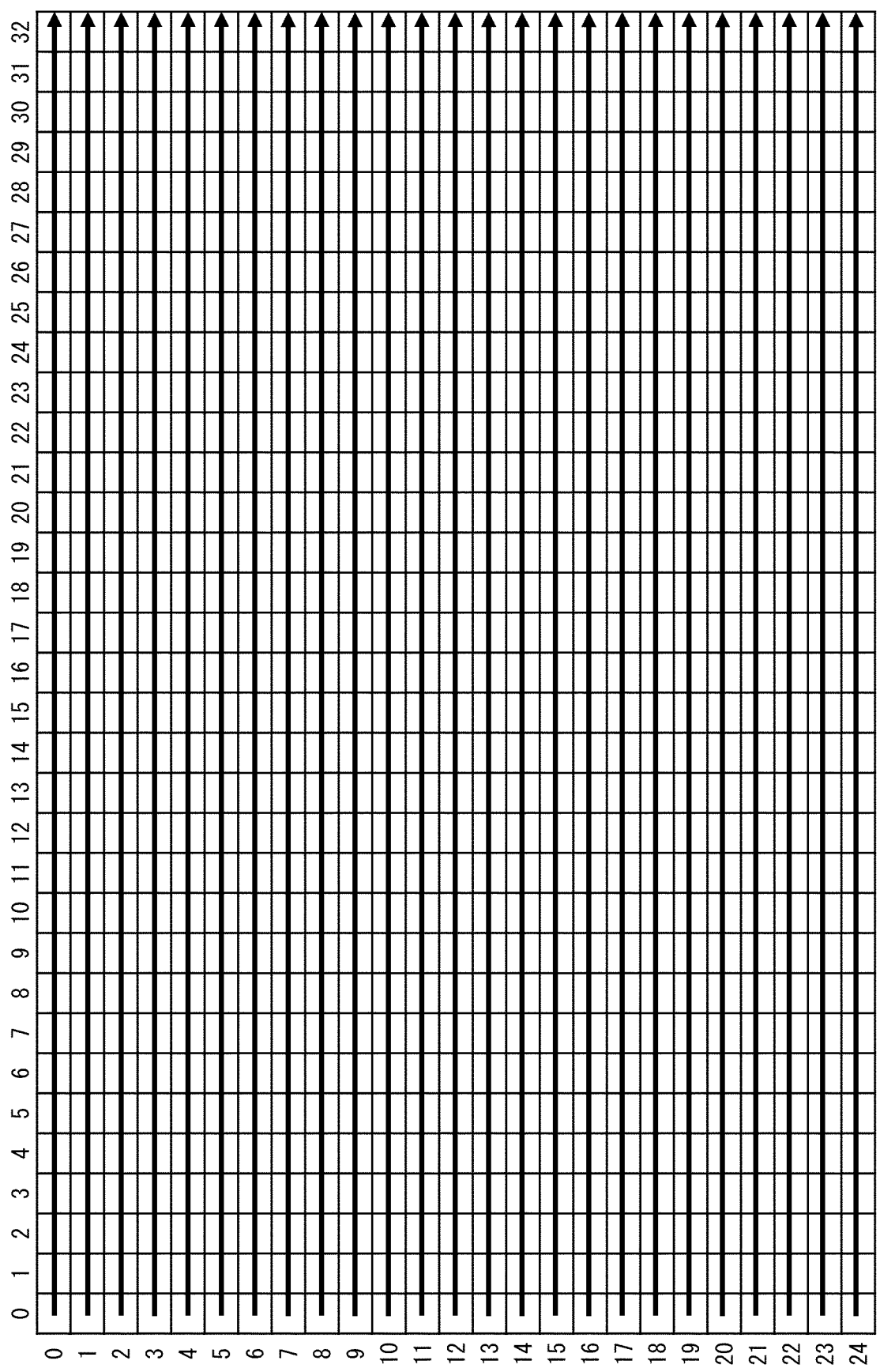
FIG. 4 is a view schematically illustrating how, in the smoothed image generating device in accordance with Embodiment 1 of the present invention, a smoothing filter for smoothing of brightness is applied to reduced-size divided data.

FIG. 4 schematically illustrates how a smoothing filter for smoothing of brightness is applied to reduced-size divided data generated by the reduced-size divided data generating section 11. According to an example illustrated in FIG. 4, the reduced-size divided data is divided into 25×33 areas. Note that, in the following description, the smoothing processing section 12 uses a smoothing filter which employs linear interpolation, but a type of a filter to be used is not particularly limited, provided that brightness indicated by the reduced-size divided data can be smoothed.

As shown by arrows in FIG. 4, the smoothing processing section 12 carries out the smoothing process for each given range, which is at least part of a row of areas, with use of the smoothing filter. More specifically, the smoothing processing section 12 carries out the smoothing process while moving, in a direction indicated by the arrows in FIG. 4, a position of the smoothing filter by a range smaller than the each given range. The smoothing processing section 12 thus generates smoothed reduced-size divided data.

Figure 5:
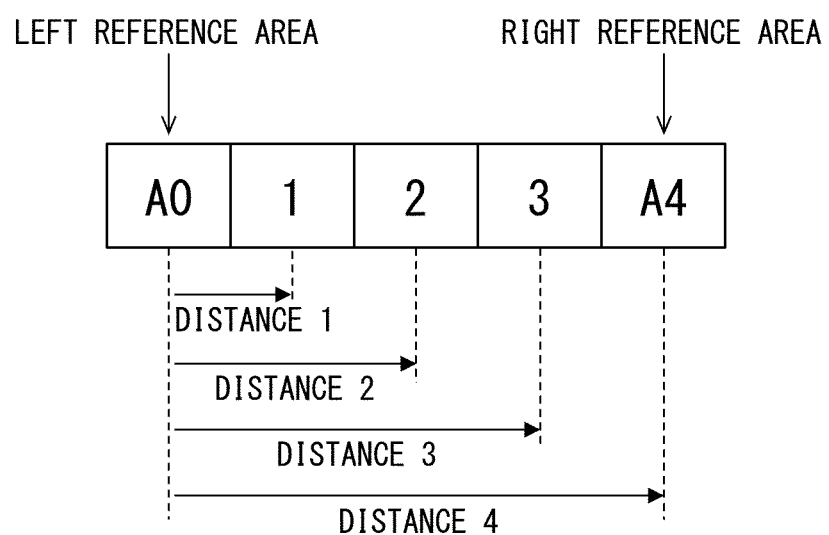
FIG. 5 is a view schematically illustrating an example linear interpolation filter which is applied to rows of areas constituting reduced-size divided data, in the smoothed image generating device in accordance with Embodiment 1 of the present invention.

FIG. 5 illustrates an example linear interpolation filter which the smoothing processing section 12 applies to rows of areas. The example linear interpolation filter illustrated in FIG. 5 is arranged such that five areas, represented by A0, 1, 2, 3, and A4 in order from the left, are used and that a distance between areas, which distance indicates a given range, is 4. Note that, in an example illustrated in FIG. 5, out of the five areas, an area which is represented by A0 and which is located on the far left is regarded as a "left reference area," and an area which is represented by A4 and which is located on the far right is regarded as a "right reference area." Note also that a distance between adjacent two areas is 1 (one), and each area has an identical size. In this case, since a distance between A0 and A4 is 4, the linear interpolation filter is referred to as a "distance 4 smoothing filter." The smoothing processing section 12 smooths brightness indicated by each of three areas which are located between the "left reference area" and the "right reference area," with use of brightness indicated by the "left reference area," brightness indicated by the "right reference area," and distances between areas. In other words, as the "left reference area" and the "right reference area," the smoothing processing section 12 selects two areas which are present in a horizontal direction. Further, the smoothing processing section 12 calculates a predictive value of brightness indicated by a specific area which is located between the two areas, by linear interpolation with use of brightness indicated by each of the two areas, and carries out smoothing with use of the predictive value.

Figure 6:
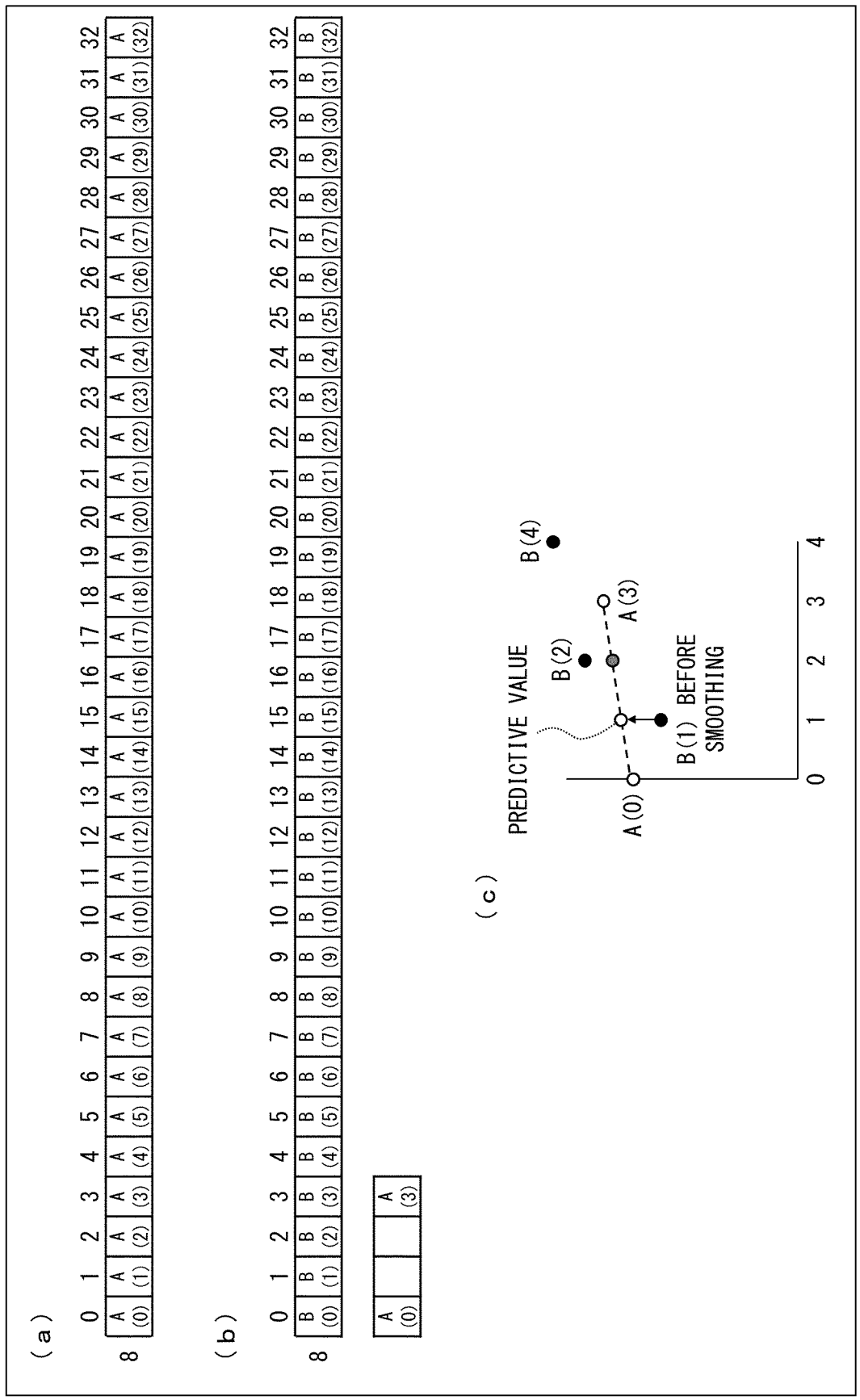
FIG. 6 illustrates an example in which a distance 3 linear interpolation filter is applied to a row of areas included in the reduced-size divided data illustrated in FIG. 4. (a) of FIG. 6 illustrates the row of areas, which row is numbered 8. (b) of FIG. 6 illustrates an example in which application of the distance 3 linear interpolation filter is started with respect to the row of areas illustrated in (a) of FIG. 6. (c) of FIG. 6 illustrates an example in which brightness is smoothed by application of the linear interpolation filter.

FIG. 6 illustrates an example in which a distance 3 linear interpolation filter is applied to a row of areas included in the reduced-size divided data illustrated in FIG. 4. (a) of FIG. 6 illustrates the row of areas, which row is numbered 8. (b) of FIG. 6 illustrates an example in which application of the distance 3 linear interpolation filter is started with respect to the row of areas illustrated in (a) of FIG. 6. (c) of FIG. 6 illustrates an example in which brightness is smoothed by the application of the linear interpolation filter.

First, as illustrated in (a) of FIG. 6, the smoothing processing section 12 selects a row of areas from the reduced-size divided data. According to an example illustrated in (a) of FIG. 6, the row of areas, which row is numbered 8, is selected. That is, 33 areas which are specified by (8, 0) though (8, 32) in terms of (row number, column number) are selected. Note that values of brightness set in the respective 33 areas to which the linear interpolation filter has not yet been applied are represented by A(0) through A(32) with use of the column numbers of the 33 areas.

A method of applying the distance 3 linear interpolation filter to the row of areas illustrated in (a) of FIG. 6 will be described below with reference to (b) of FIG. 6. In the example illustrated in (b) of FIG. 6, the values of the brightness indicated by the respective 33 areas to which the distance 3 linear interpolation filter has been applied are represented by B(0) through B(32). That is, before the linear interpolation filter is applied, an expression "A(n)=B(n) (n=0 through 32)" is established.

The smoothing processing section 12 applies the distance 3 linear interpolation filter from the far left of the row of areas, which row is numbered 8, illustrated in (b) of FIG. 6. Specifically, the smoothing processing section 11 smooths brightness indicated by each of two areas which are specified by (8, 1) and (8, 2) in terms of (row number, column number), with use of the brightness indicated by a "left reference area" which is specified by (8, 0) in terms of (row number, column number), the brightness indicated by a "right reference area" which is specified by (8, 3) in terms of (row number, column number), and distances between areas.

As the smoothing process, the smoothing processing section 12 calculates a predictive value of the brightness indicated by an area which is specified by, for example, (8, 1) in terms of (row number, column number), with use of the brightness indicated by the "left reference area," the brightness indicated by the "right reference area," and distances between areas. The predictive value can be, for example, calculated by the following expression.

Predictive value for (8, 1) =

$$((\text{distance } 4 - 1) \times A(0) + 1 \times A(3))/\text{distance } 4 =$$

$$(3 \times A(0) + A(3))/\text{distance } 4$$

Assumed that a distance from the "left reference area" is represented by d (d<distance 4), the expression can be as follows.

Predictive value for an area at adistance $d$ from a "left reference area"=((distance $4-d$)×$A(0)$+$d$×$A(3)$)/distance $d$ The smoothing processing section 12 thus calculates predictive values of the brightness indicated by respective (8, 1) and (8, 2). Then, in accordance with, for example, a condition described below, the smoothing processing section replaces values B(1) and B(2) with the respective predictive values thus calculated, thereby smoothing the brightness.

(c) of FIG. 6 illustrates a detailed example in which the smoothing processing section 12 smooths brightness with use of a predictive value. In the example illustrated in (c) of FIG. 6, a horizontal axis shows column numbers, and a vertical axis shows levels of the brightness. For example, the predictive values of the brightness indicated by the respective areas which are specified by (8, 1) and (8, 2) in terms of (row number, column number) are plotted on a straight line which connects A(0) and A(3).

A case where (i) the value B(1) of the brightness indicated by (8, 1) is lower than the predictive value of the brightness indicated by (8, 1) and (ii) the value B(2) of the brightness indicated by (8, 2) is higher than the predictive value of the brightness indicated by (8, 2), as illustrated in (c) of FIG. 6, will be considered. In this case, the smoothing processing section 12 replaces the value B(1) of the brightness indicated by (8, 1) with the predictive value of the brightness indicated by (8, 1), but does not replace the value B(2) of the brightness indicated by (8, 2) with the predictive value of the brightness indicated by (8, 2). That is, the smoothing processing section 12 calculates a predictive value which predicts a value of brightness indicated by an area sandwiched between areas located at respective ends of a given range to which a linear interpolation filter is applied, with use of values of brightness indicated by the respective areas located at the respective ends of the given range, out of areas included in the given range. Then, in a case where the value of the brightness indicated by the area is lower than the predictive value thus calculated, the smoothing processing section 12 replaces the value of the brightness with the predictive value, thereby carrying out the smoothing process.

Generally, in a case where a problem, such as incorporation of a foreign matter into the image capturing device 2, occurs, an optical path in an optical system of the image capturing device 2 is partially blocked. It is considered that blocking of the optical path causes a decrease in brightness. Therefore, brightness whose value is lower than a predictive value is smoothed with use of the predictive value. In contrast, it is considered that brightness whose value is higher than a predictive value results from a reason other than the image capturing device 2 (for example, the light source 3 has ununiform brightness). Therefore, the brightness whose value is higher than the predictive value is preferably not smoothed with use of the predictive value. Thus, the smoothing processing section 12 in accordance with Embodiment 1 generates smoothed reduced-size divided data by, in a case where reduced-size divided data includes a region which indicates brightness whose value is lower than a predictive value calculated with use of a smoothing filter, replacing the value of the brightness with the predictive value.

Figure 7:
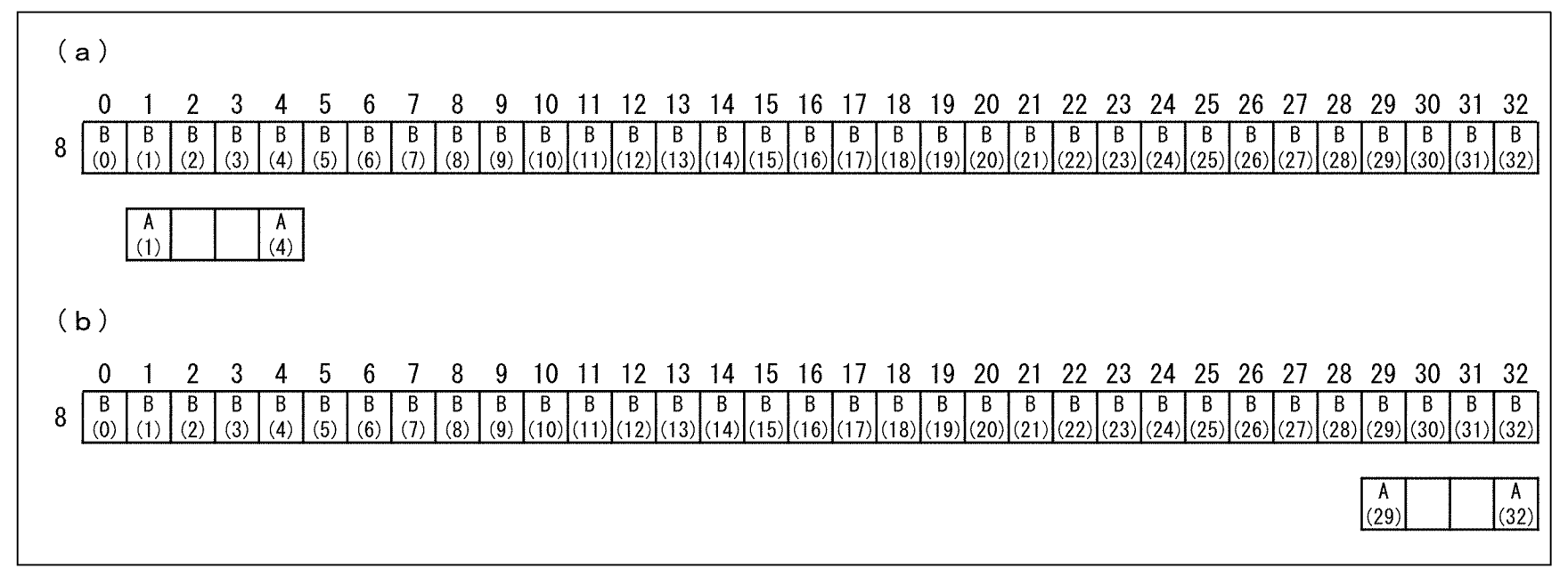

FIG. 7 illustrates a state where the smoothing process illustrated in each of (a) through (c) of FIG. 6 has been carried out. (a) of FIG. 7 illustrates a state where, after carrying out the smoothing process illustrated in each of (a) through (c) of FIG. 6, the smoothing processing section 12 has moved a position of the smoothing filter rightward by one. Note that a distance by which the smoothing processing section 12 moves the position of the smoothing filter is not particularly limited, provided that the distance is shorter than the distance of the smoothing filter. According to (a) of FIG. 7, the area which is specified by (8, 1) in terms of (row number, column number) is set as a "left reference area," and an area which is specified by (8, 4) is set as a "right reference area." In this case, the smoothing processing section 12 calculates a predictive value corresponding to the value B(2) of the brightness indicated by (8, 2) and a predictive value corresponding to a value B(3) of the brightness indicated by (8, 3), with use of a value A(1) of the brightness indicated by (8, 1) in the reduced-size divided data, a value A(4) of brightness indicated by (8, 4) in the reduced-size divided data, and a distance from (8, 1). The smoothing processing section 12 then compares such calculated predictive values of the brightness with the respective current values B(2) and B(3), and replaces, as necessary, the values B(2) and B(3) with the respective predictive values, as described with reference to (c) of FIG. 6. It should be noted that the current value B(2) which is compared with the predictive value may have been replaced with the predictive value which has been calculated with use of the value A(0) of the brightness indicated by (8, 0), the value A(3) of the brightness indicated by (8, 3), and a distance from (8, 0), by the smoothing process described with reference to FIG. 6.

After (a) of FIG. 7, the smoothing processing section 12 further moves the smoothing filter rightward, and similarly carries out the smoothing process. The smoothing processing section 12 repeats such operation until the smoothing filter reaches the far right of the row of areas as illustrated in (b) of FIG. 7. In a case where the smoothing processing section 12 completes the smoothing process (calculation of a predictive value, comparison between the predictive value and a current value of brightness, and replacement of the current value with the predictive value) in a state where an area which is specified by (8, 32) is set as a "right reference area" (see (b) of FIG. 7), the smoothing processing section 12 ends the application of the distance 3 linear interpolation filter with respect to the row of areas, which row is numbered 8.

According to Embodiment 1, the smoothing processing section 12 carries out the smoothing process with use of a plurality of smoothing filters which are different in distance between areas. For example, in a case where the smoothing processing section 12 completes the smoothing process with use of the distance 3 linear interpolation filter in the state illustrated in (b) of FIG. 7, the smoothing processing section 12 newly starts the smoothing process with respect to the row of areas, which row is numbered 8, with use of a distance 4 linear interpolation filter. The smoothing process carried out with use of the distance 4 linear interpolation filter is similar to that described with reference to FIGS. 6 and 7, except that a distance between a "left reference area" and a "right reference area" is different.

The smoothing processing section 12 thus carries out the smoothing process with respect to a row of areas with use of a plurality of smoothing filters. In other words, the smoothing processing section 12 carries out the smoothing process with use of a plurality of smoothing filters which are different in distance between a "left reference area" and a "right reference area," which distance indicates a given range. Specifically, after the smoothing processing section 12 completes the smoothing process with use of a smoothing filter with which the given range is smaller, the smoothing processing section 12 carries out the smoothing process with use of a smoothing filter with which the given range is larger.

The smoothing processing section 12 carries out the smoothing process, as has been described above, with respect to all of rows of areas constituting the reduced-size divided data. As a result, the smoothed reduced-size divided data, in which brightness indicated by all of the rows of areas constituting the reduced-size divided data is smoothed, is generated. The smoothed reduced-size divided data is data in which (i) a local variation in brightness is smoothed with use of the smoothing filter with which the given range is smaller and (ii) an overall variation in brightness is smoothed with use of the smoothing filter with which the given range is larger.

(Details of Expansion of Smoothed Reduced-Size Divided Data and Interpolating Process)

Example expansion of smoothed reduced-size divided data and an example interpolating process, each of which is carried out by the smoothed image generating section 13 in the smoothed image generating device 1 in accordance with Embodiment 1, will be described below with reference to FIGS. 8 through 10.

Figure 8:
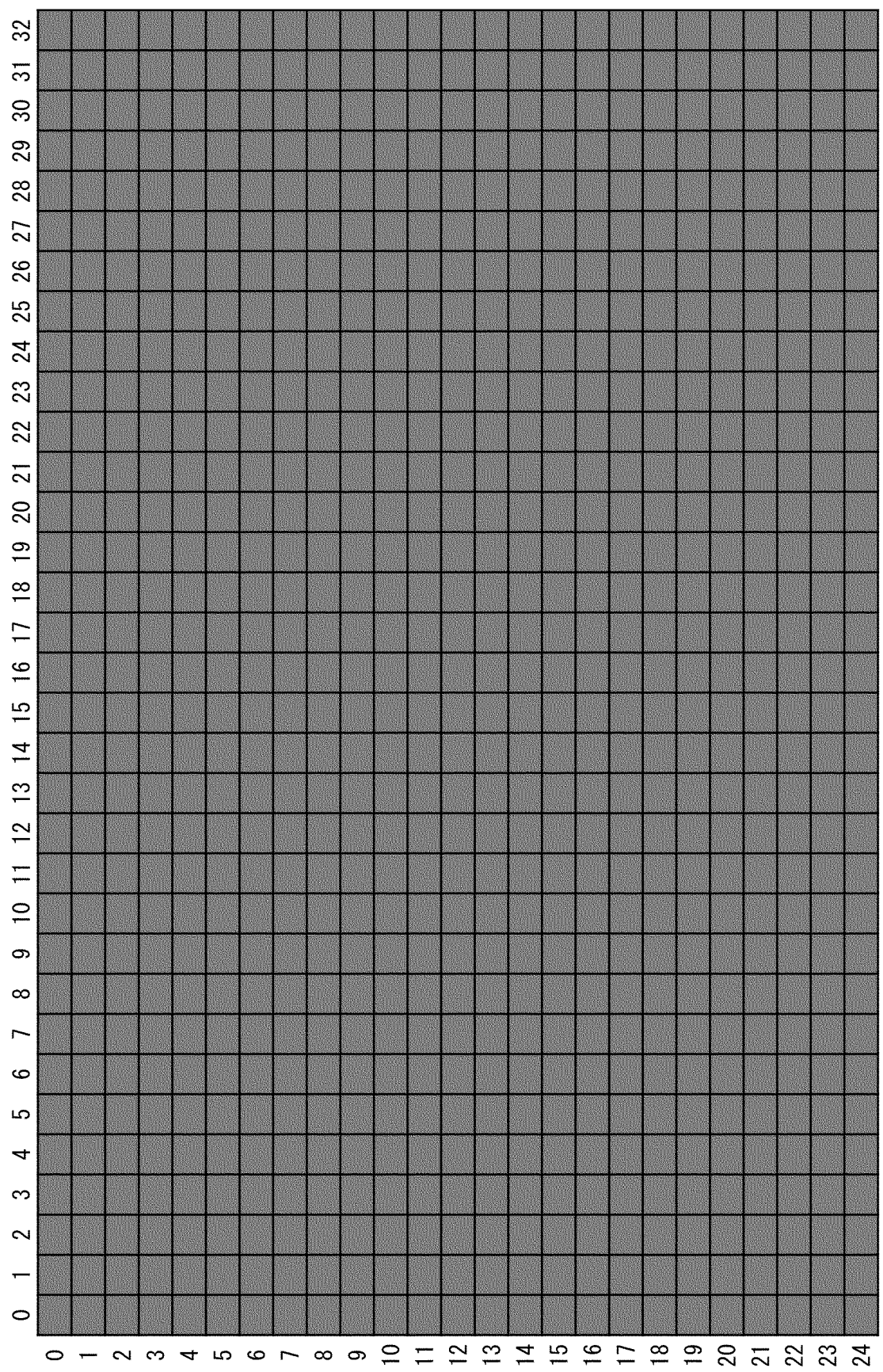
FIG. 8 is a view schematically illustrating smoothed reduced-size divided data which has been generated by carrying out the smoothing process with respect to the reduced-size divided data illustrated in FIG. 3.

FIG. 8 schematically illustrates smoothed reduced-size divided data which the smoothing processing section 12 has generated by carrying out the smoothing process with respect to the reduced-size divided data illustrated in FIG. 3. According to an example illustrated in FIG. 8, the smoothed reduced-size divided data is divided into 25×33 areas.

Figure 9:
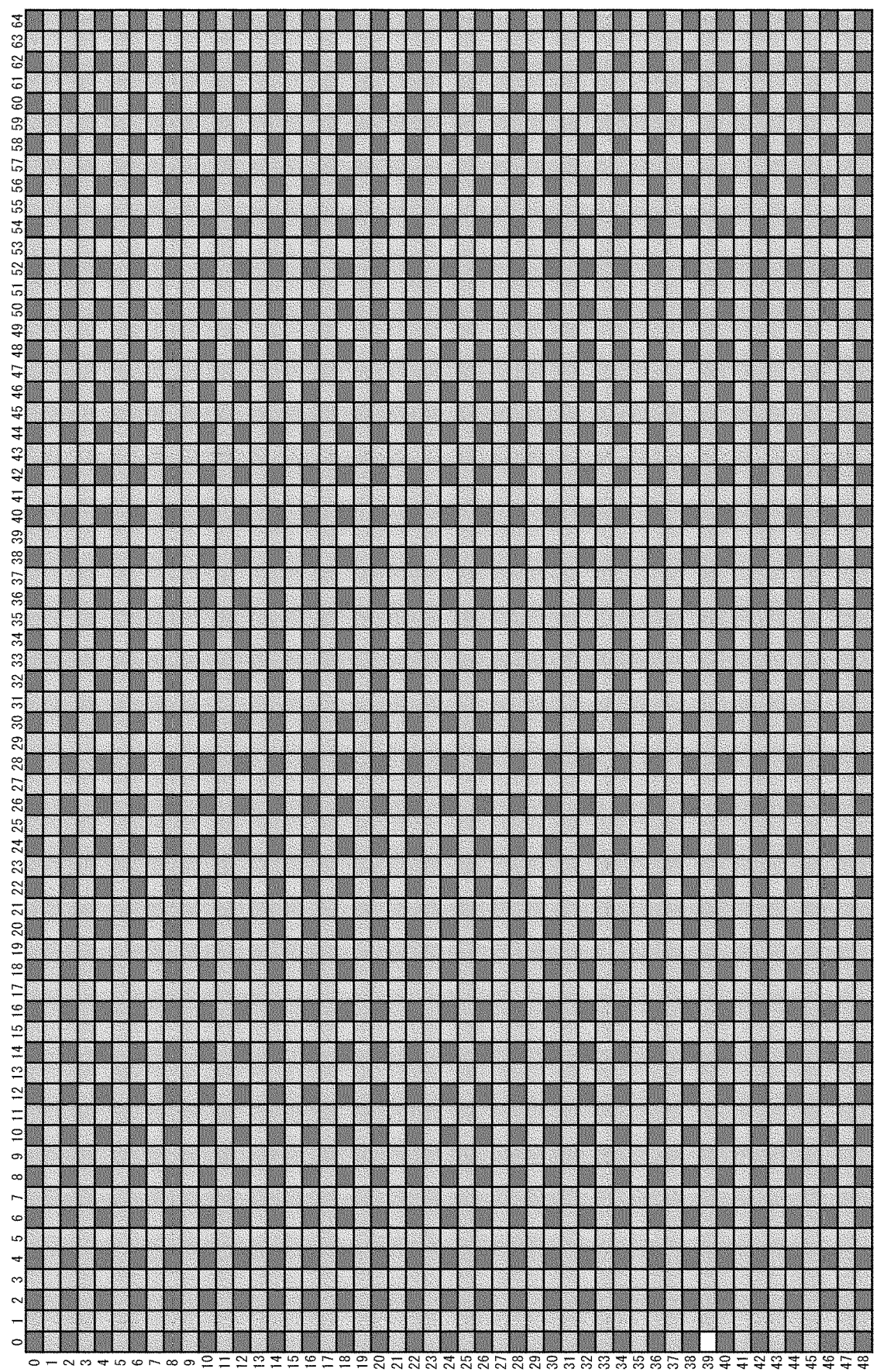
FIG. 9 is a view schematically illustrating data which has been generated by expanding the smoothed reduced-size divided data illustrated in FIG. 8 and which is identical in size to the original divided data.

FIG. 9 is a view schematically illustrating data which has been generated by expanding the smoothed reduced-size divided data illustrated in FIG. 8 and which is identical in size to the original divided data. That is, contrary to a case where the reduced-size divided data illustrated in FIG. 3 is generated by extracting areas from the original divided data illustrated in FIG. 2, the smoothed image generating section 13 arranges the areas, constituting the smoothed reduced-size divided data illustrated in FIG. 8, at respective locations corresponding to those in the original divided data, and thereby generates the data identical in size to the original divided data. In so doing, in FIG. 9, areas in which the areas constituting the smoothed reduced-size divided data illustrated in FIG. 8 are not arranged are blank areas in each of which brightness is not set.

Figure 10:
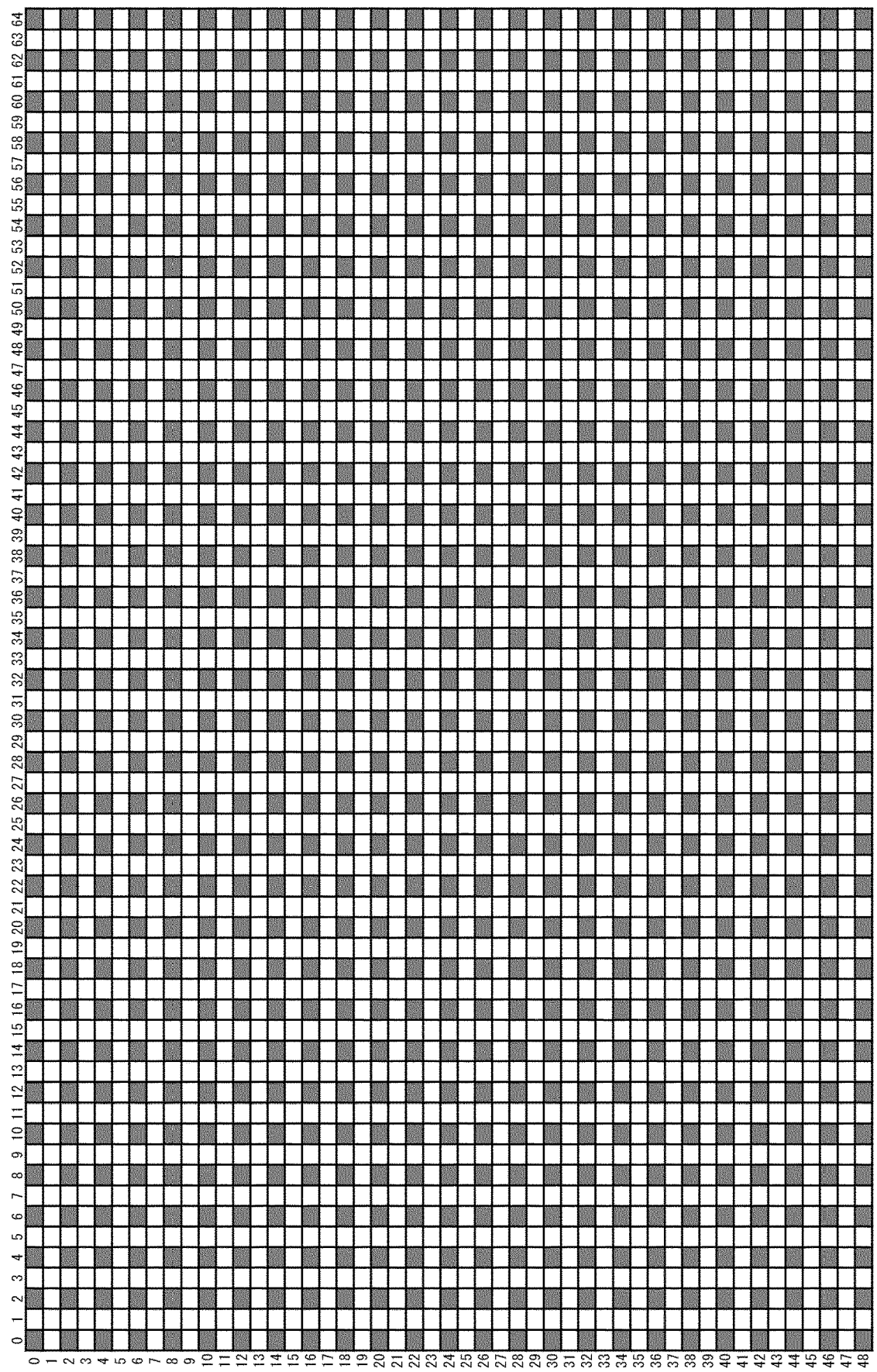
FIG. 10 is a view schematically illustrating smoothed divided data which has been generated by applying an interpolating process to the data illustrated in FIG. 9.

FIG. 10 is a view schematically illustrating smoothed divided data (smoothed image data) which the smoothed image generating section 13 has generated by applying the interpolating process to the data illustrated in FIG. 9. The smoothed image generating section 13 sets, in each of the blank areas located between the areas in FIG. 9, brightness calculated by linear interpolation, and thereby generates the smoothed divided data. The linear interpolation can be similar to, for example, the linear interpolation which the smoothing processing section 12 has applied to the reduced-size divided data. Specifically, it is possible to calculate brightness to be set in a blank area which is specified by (0, 1) in terms of (row number, column number), with use of a distance 2 linear interpolation filter which causes (0, 0) to be a "left reference area" and causes (0, 2) to be a "right reference area." Note that, in FIG. 10, areas included in a row which is numbered, for example, 1 are all blank areas. Thus, the smoothed image generating section 13 calculates, with use of a linear interpolation filter, brightness to be set in (1, 0) from brightness indicated by (0, 0) and brightness indicated by (2, 0). Furthermore, the smoothed image generating section 13 calculates, with use of the linear interpolation filter, brightness to be set in (1, 2) from brightness indicated by (0, 2) and brightness indicated by (2, 2). The smoothed image generating section 13 then calculates, with use of the linear interpolation filter, brightness to be set in a blank area specified by (1, 1), from the brightness indicated by (1, 0) and the brightness indicated by (1, 2). With regard to rows each of which includes merely blank areas, the smoothed image generating section 13 is capable of calculating and setting brightness in such a manner.

Note that the smoothed image generating section 13 can use any filter for the interpolating process, provided that the smoothed image generating section 13 is capable of calculating brightness to be set in each of the blank areas.

(Flow of Process)

Figure 11:
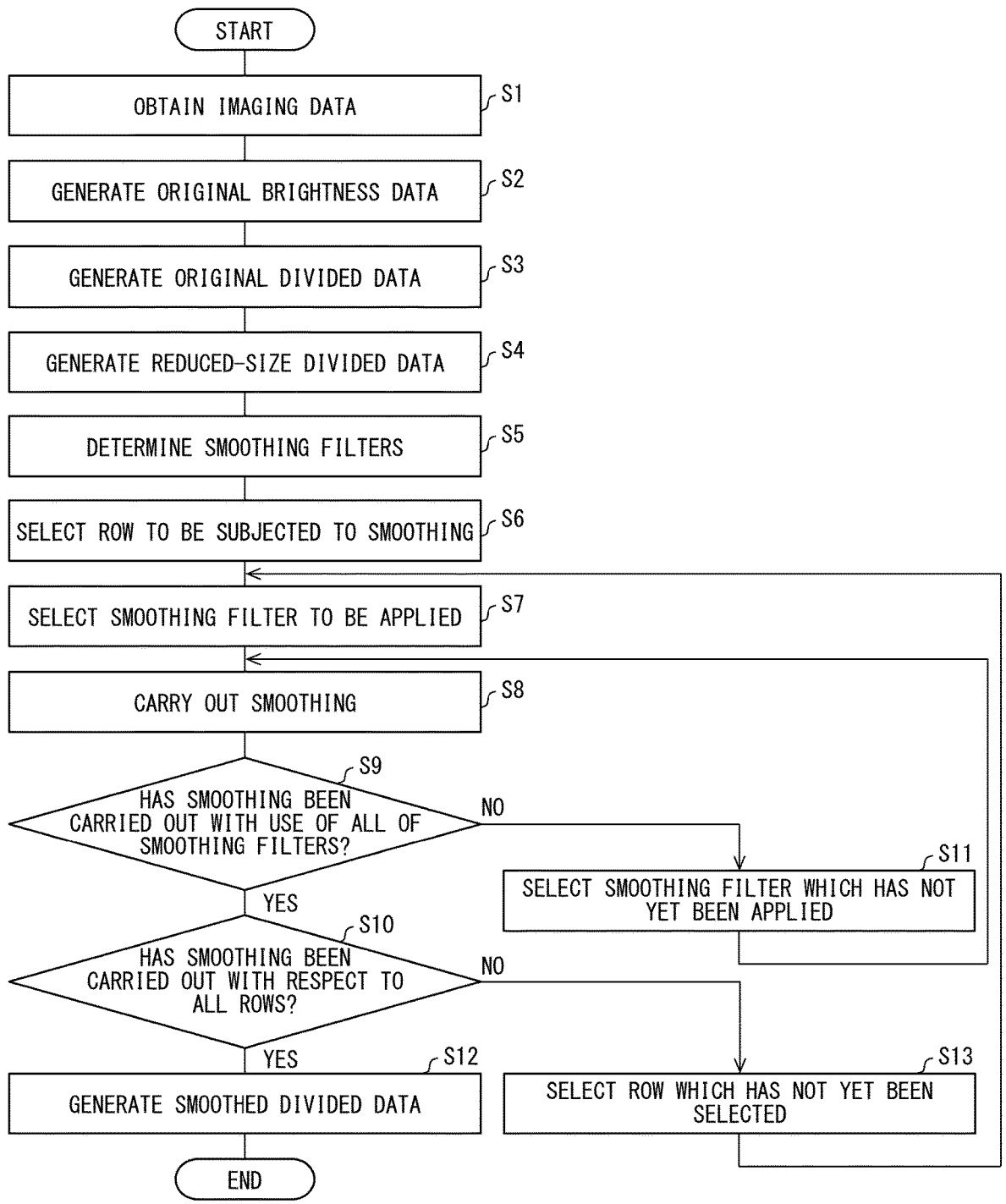
FIG. 11 is a flowchart illustrating an example flow of a process which is carried out by the smoothed image generating device in accordance with Embodiment 1 of the present invention.

An example process which is carried out by the smoothed image generating device 1 in accordance with Embodiment 1 will be described below with reference to FIG. 11. FIG. 11 is a flowchart illustrating an example flow of a process which is carried out by the smoothed image generating device 1.

First, in a case where the image capturing device 2 captures the light source 3 that is a subject having uniform brightness, the control section 10 of the smoothed image generating device 1 obtains, via the data input section 50, imaging data which has been generated by the image capturing device 2 and to which shading correction has been made (S1). The control section 10 then generates original brightness data by extracting brightness information from the imaging data obtained in the step S1 (S2).

After the step S2, the control section 10 divides the original brightness data into a plurality of areas as illustrated in FIG. 2. The control section 10 then calculates an average of brightness indicated by a plurality of pixels corresponding to each of the plurality of areas, and sets brightness indicated by the each of the plurality of areas to the average. The control section 10 carries out the foregoing process with respect to all of the plurality of areas, and thereby generates original divided data in which a single brightness level is set in each of the plurality of areas (S3). Subsequently, the reduced-size divided data generating section 11 extracts every second area in a horizontal direction and in a vertical direction, out of the plurality of areas constituting the original divided data, as described with reference to FIGS. 2 and 3, and thereby generates reduced-size divided data (S4: reduced-size divided data generating step).

After the step S4, the smoothing processing section 12 determines a plurality of smoothing filters to be used for smoothing as described with reference to FIG. 5 (S5). Next, the smoothing processing section 12 selects, out of a plurality of rows of areas constituting the reduced-size divided data, a row of areas to be subjected to the smoothing (S6). The smoothing processing section 12 then selects, out of the plurality of smoothing filters determined in the step S5, a smoothing filter to be applied to such a selected row of areas (S7). Subsequently, the smoothing processing section 12 applies the smoothing filter, which has been selected in the step S7, to the row of areas, which has been selected in the step S6, and carries out the smoothing (S8: smoothing processing step). Specifically, the smoothing processing section 12 carries out the smoothing as described with reference to FIGS. 6 and 7.

After the step S8, the smoothing processing section 12 determines whether or not to have carried out the smoothing with respect to the row of areas, which has been selected in the step S6, with use of all of the plurality of smoothing filters, which are used for the smoothing and which have been determined in the step S5 (S9). In a case where the smoothing processing section 12 determines that the smoothing processing section 12 has carried out the smoothing with respect to the row of areas with use of all of the plurality of smoothing filters (YES in S9), the process proceeds to a step S10. In a case where the smoothing processing section 12 determines that the smoothing processing section 12 has not carried out the smoothing with respect to the row of areas with use of all of the plurality of smoothing filters (NO in S9), the smoothing processing section 12 selects, out of the plurality of smoothing filters determined in the step S5, a smoothing filter which has not yet been applied to the row of areas, which has been selected in the step S6 (S11). Thereafter, the process proceeds to the step S8, and the steps S8 and S9 are carried out again.

In the step S10, the smoothing processing section 12 determines whether or not the smoothing processing section 12 has carried out the smoothing with respect to all of the plurality of rows of areas constituting the reduced-size divided data (S10). In a case where the smoothing processing section 12 determines that the smoothing processing section 12 has carried out the smoothing with respect to all of the plurality of rows of areas (YES in S10), the process proceeds to a step S12. In a case where the smoothing processing section 12 determines that the smoothing processing section 12 has not carried out the smoothing with respect to all of the plurality of rows of areas (NO in S10), the smoothing processing section 12 selects, out of the plurality of rows of areas constituting the reduced-size divided data, a row of areas which has not yet been selected (S13). Thereafter, the process proceeds to the step S7, and the steps S7 through S11 are carried out again. The smoothing processing section 12 carries out the steps S6 through S11 and S13, thereby generating smoothed reduced-size divided data which is data obtained by applying the plurality of smoothing filters to all of the plurality of rows of areas constituting the reduced-size divided data.

In the step S12, the smoothed image generating section 13 expands the smoothed reduced-size divided data as described with reference to FIGS. 8 through 10, and thereby generates data identical in size to the original divided data. The smoothed image generating section 13 then applies the interpolating process to the data thus generated, and thereby generates smoothed divided data (smoothed image data) identical in size to the original divided data (S12: smoothed image generating step).

The smoothed image generating device 1 in accordance with Embodiment 1 thus carries out the smoothing process and the interpolating process with respect to reduced-size divided data, thereby generating smoothed image data identical in size to original divided data. This allows a reduction in amount of calculation required for smoothing, as compared with a case where the smoothing process is applied to the original divided data. Therefore, it is possible to provide a smoothed image generating device 1 capable of rapidly smoothing brightness information.

Note that, according to Embodiment 1, the smoothing processing section 12 applies, on a row-by-row basis, the smoothing filter to the plurality of areas constituting the original divided data. However, the smoothing processing section 12 is not limited to such a configuration. For example, the smoothing processing section 12 can apply the smoothing filter to the plurality of areas on a column-by-column basis. Alternatively, the smoothing processing section 12 can apply the smoothing filter to the plurality of areas on a row-by-row basis and then apply the smoothing filter to the plurality of areas on a column-by-column basis. In other words, the smoothing processing section 12 can use a smoothing filter which is applied to a given range that includes vertically or horizontally arranged areas and which causes a predictive value to be calculated by linear interpolation with use of values of brightness indicated by respective areas that are located at respective ends of the given range.

Note also that a direction in which the smoothing processing section 12 applies the smoothing filter is not limited to a direction of a row and a direction of a column. For example, in the reduced-size divided data illustrated in FIG. 4, the smoothing process can be carried out obliquely downward at an angle of 45° from an upper left area. Alternatively, the smoothing process can be carried out obliquely upward at an angle of 45° from a lower right area. In other words, the smoothing processing section 12 can use a smoothing filter which is applied to a given range that includes obliquely arranged areas and which causes a predictive value to be calculated by linear interpolation with use of values of brightness indicated by respective areas that are located at respective ends of the given range.

Moreover, in Embodiment 1, the number of areas which the reduced-size divided data generating section 11 extracts from the original divided data is not particularly limited, but is preferably determined in consideration of entire time which the smoothed image generating device 1 takes to generate the smoothed divided data from the imaging data. Specifically, in a case where the reduced-size divided data generating section 11 extracts a small number of areas, the reduced-size divided data is constituted by the small number of areas. Therefore, the number of areas which are subjected to the smoothing process carried out by the smoothing processing section 12 and to the interpolating process carried out by the smoothed image generating section 13 becomes low. In this case, by, for example, increasing the number of smoothing filters used for the smoothing process, accuracy of the smoothing can be increased.

Embodiment 2

Figure 12:
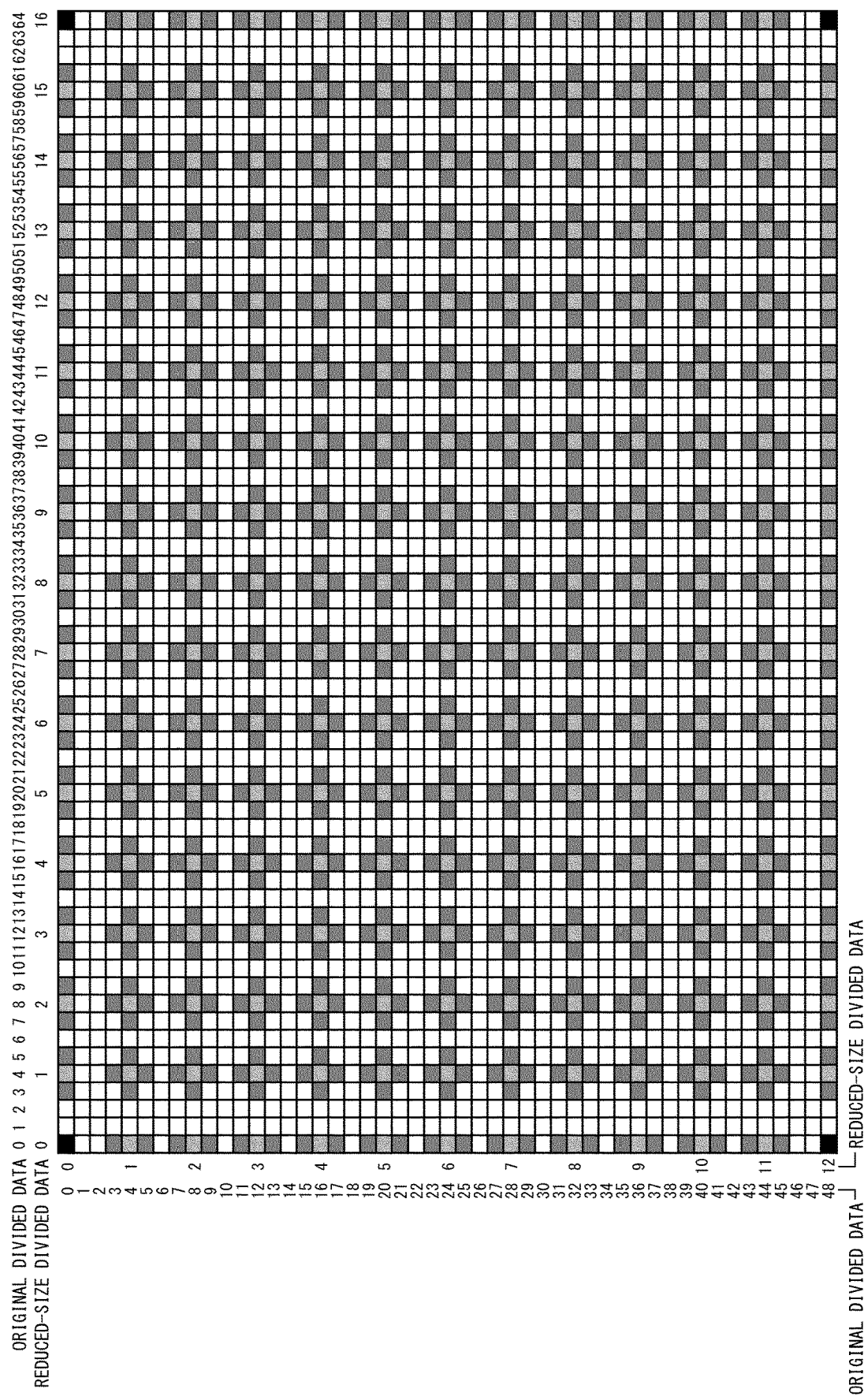
FIG. 12 is a view schematically illustrating areas to be extracted from original divided data in a smoothed image generating device in accordance with Embodiment 2 of the present invention.

The following description will discuss Embodiment 2 of the present invention with reference to FIGS. 1, 11, and 12. Note that, for convenience, a member having a function identical to that of a member described in Embodiment 1 will be given an identical reference numeral, and will not be described below.

(Configuration of Smoothed Image Generating Device)

A configuration of a smoothed image generating device 1 in accordance with Embodiment 2 is basically identical to but is partially different from that described with reference to FIG. 1 in Embodiment 1. A reduced-size divided data generating section 11 divides original divided data into three types of regions, a first one of which includes four regions including respective corners, a second one of which includes regions constituting an outer periphery, and a third one of which includes the other region. Furthermore, the reduced-size divided data generating section 11 extracts areas by methods which are different between the three types of regions, into which the original divided data is divided, and generates reduced-size divided data. In those points, the reduced-size divided data generating section 11 is different from that in Embodiment 1. Moreover, the reduced-size divided data generating section 11 sets, in such extracted areas, brightness calculated by methods which are different between the three types of regions, and generates the reduced-size divided data. A specific example in which the reduced-size divided data generating section 11 extracts areas from original divided data and generates reduced-size divided data will be described below.

(Specific Example of Extraction of Areas)

A specific example in which the reduced-size divided data generating section 11 in Embodiment 2 generates reduced-size divided data from original divided data will be described below with reference to FIG. 12. FIG. 12 is a view schematically illustrating areas to be extracted from original divided data. According to an example illustrated in FIG. 12, the original divided data is constituted by 49×65 areas.

The reduced-size divided data generating section 11 first divides the original divided data illustrated in FIG. 12 into three types of regions. A first one of the three types of regions includes regions which includes respective corners of the original divided data. According to the example illustrated in FIG. 12, for example, a region which is constituted by nine areas whose row numbers are 0 to 2 and whose column numbers are 0 to 2 is divided into the first one. That is, four regions each of which is constituted by nine areas including a corresponding one of the corners of the original divided data are divided into the first one.

A second one of the three types of regions includes regions which constitute an outer periphery of the original divided data. According to the example illustrated in FIG. 12, for example, a strip-shaped region which is constituted by areas whose row numbers are 0 to 2 and whose column numbers are 3 to 61 is divided into the second one. That is, regions each of which is constituted by three rows or three columns of areas that constitute the outer periphery, except for the corners, of the original divided data are divided into the second one.

A third one of the three types of regions includes a region which does not belong to any of the first one and the second one of the three types of regions. According to the example illustrated in FIG. 12, a rectangular region which is constituted by areas whose row numbers are 3 to 45 and whose column numbers are 3 to 61 is divided into the third one.

Next, the reduced-size divided data generating section 11 extracts areas by methods which are different between the three types of regions, and generates reduced-size divided data. FIG. 12 shows row numbers and column numbers in the original divided data and row numbers and column numbers in the reduced-size divided data.

In the first one of the three types of regions, the reduced-size divided data generating section 11 extracts areas corresponding to the respective corners of the original divided data. Specifically, the reduced-size divided data generating section 11 extracts four areas which are specified by (0, 0), (48, 0), (0, 64), and (48, 64), in terms of (row number, column number), in the original divided data. The reduced-size divided data generating section 11 then causes such extracted areas to be (0, 0), (12, 0), (0, 16), and (12, 16) in the reduced-size divided data. The reduced-size divided data generating section 11 sets, in each of those four areas, brightness whose value is identical to that of brightness indicated by the areas in the original divided data.

In the second one of the three types of regions, the reduced-size divided data generating section 11 extracts every fourth area from a row or a column of areas constituting the outer periphery. Specifically, the reduced-size divided data generating section 11 extracts areas whose column numbers are multiples of 4, from a row of areas which row is numbered 0 or 48 in the original divided data. Similarly, the reduced-size divided data generating section 11 extracts areas whose row numbers are multiples of 4, from a column of areas which column is numbered 0 or 64. In so doing, the reduced-size divided data generating section 11 sets, in each of such extracted areas, brightness whose value has been determined in consideration of brightness indicated by two areas adjacent to, on the outer periphery, the each of the extracted areas. A specific example of brightness set in an area which the reduced-size divided data generating section 11 has extracted from the second one of the three types of regions to the reduced-size divided data will be described below.

The reduced-size divided data generating section 11 extracts an area which is specified by (0, 4) in the original divided data, and causes such an extracted area to be an area which is specified by (0, 1) in the reduced-size divided data. The reduced-size divided data generating section 11 then sets, in the area which is specified by (0, 1) in the reduced-size divided data, brightness whose value has been determined in consideration of brightness indicated by (0, 3) and (0, 5) in the original divided data which are adjacent, on the outer periphery, to (0, 4) in the original divided data. Here, it is assumed that brightness indicated by an area which is to be extracted from a row of areas, which row is numbered 0, in the original divided data to the reduced-size divided data is represented by C(0, q×4) (q=1 to 15). In this case, brightness D(0, q) set in an area in the reduced-size divided data is calculated as follows.

$$D(0,q)=(C(0,q\times4-1)/4)+(C(0,q\times4)/2)\pm(C(0,q\times4+1)/4)$$

Similarly, brightness D(48, q) set in an area which has been extracted from a row of areas, which row is numbered 48, in the original divided data to the reduced-size divided data is calculated as follows.

$$D(48,q)=(C(48,q\times4-1)/4)+(C(48,q\times4)/2)\pm(C(48,q\times4+1)/4)$$

Meanwhile, it is assumed that brightness indicated by an area which is to be extracted from a column of areas, which column is numbered 0, in the original divided data to the reduced-size divided data is represented by C(p×4, 0) (p=1 to 11). In this case, brightness D(p, 0) set in an area in the reduced-size divided data is calculated as follows.

$$D(p,0)=(C(p\times4-1,0)/4)+(C(p\times4,0)/2)+(C(p\times4+1,0)/4)$$

Similarly, brightness D(p, 64) set in an area which has been extracted from a column of areas, which column is numbered 64, in the original divided data to the reduced-size divided data is calculated as follows.

$$D(p,64)=(C(p\times4-1,64)/4)+(C(p\times4,64)/2)+(C(p\times4+1,64)/4)$$

The reduced-size divided data generating section 11 thus sets brightness in areas extracted from the second one of the three types of regions.

In the third one of the three types of regions, the reduced-size divided data generating section 11 extracts every fourth areas in a horizontal direction and in a vertical direction from the rectangular region which is constituted by the areas whose row numbers are 3 to 45 and whose column numbers are 3 to 61 in the original divided data. The reduced-size divided data generating section 11 then causes such extracted areas to be areas in the reduced-size divided data. In other words, an area which is specified by (r×4, s×4) (r=1 to 11, s=1 to 15) in terms of (row number, column number) is extracted from the original divided data, and is arranged as an area which is specified by (r, s) in the reduced-size divided data. In so doing, the reduced-size divided data generating section 11 sets, in such an extracted area, brightness whose value has been determined in consideration of brightness indicated by four areas adjacent to, in the horizontal direction or the vertical direction, the extracted area. That is, in a case where it is assumed that brightness indicated by an area which is to be extracted from the original divided data to the reduced-size divided data is represented by C(r×4, s×4), brightness D(r, s) set in an area in the reduced-size divided data is calculated as follows.

$$D(r,s)=(C(r\times4,s\times4)/2)+(c(r\times4-1,s\times4)/8)+(c(r\times4+1,s\times4)/8)+(C(r\times4,s\times4-1)/8)+(C(r\times4,s\times4+1)/8)$$

The reduced-size divided data generating section 11 thus sets brightness in areas extracted from the third one of the three types of regions.

In this manner, the reduced-size divided data generating section 11 in accordance with Embodiment 2 extracts areas from original divided data, adjusts brightness, and thereby generates reduced-size divided data.

(Flow of Process)

A process carried out by the smoothed image generating device 1 in accordance with Embodiment 2 is basically identical to but is partially different from that described with reference to FIG. 11 in Embodiment 1. In a step S4, the reduced-size divided data generating section 11 generates reduced-size divided data from original divided data by a method as described with reference to FIG. 12.

Therefore, the smoothed image generating device 1 is capable of setting, in a corresponding area in reduced-size divided data, brightness which has been determined in consideration of brightness indicated by adjacent areas in original divided data.

Embodiment 3

Figure 13:
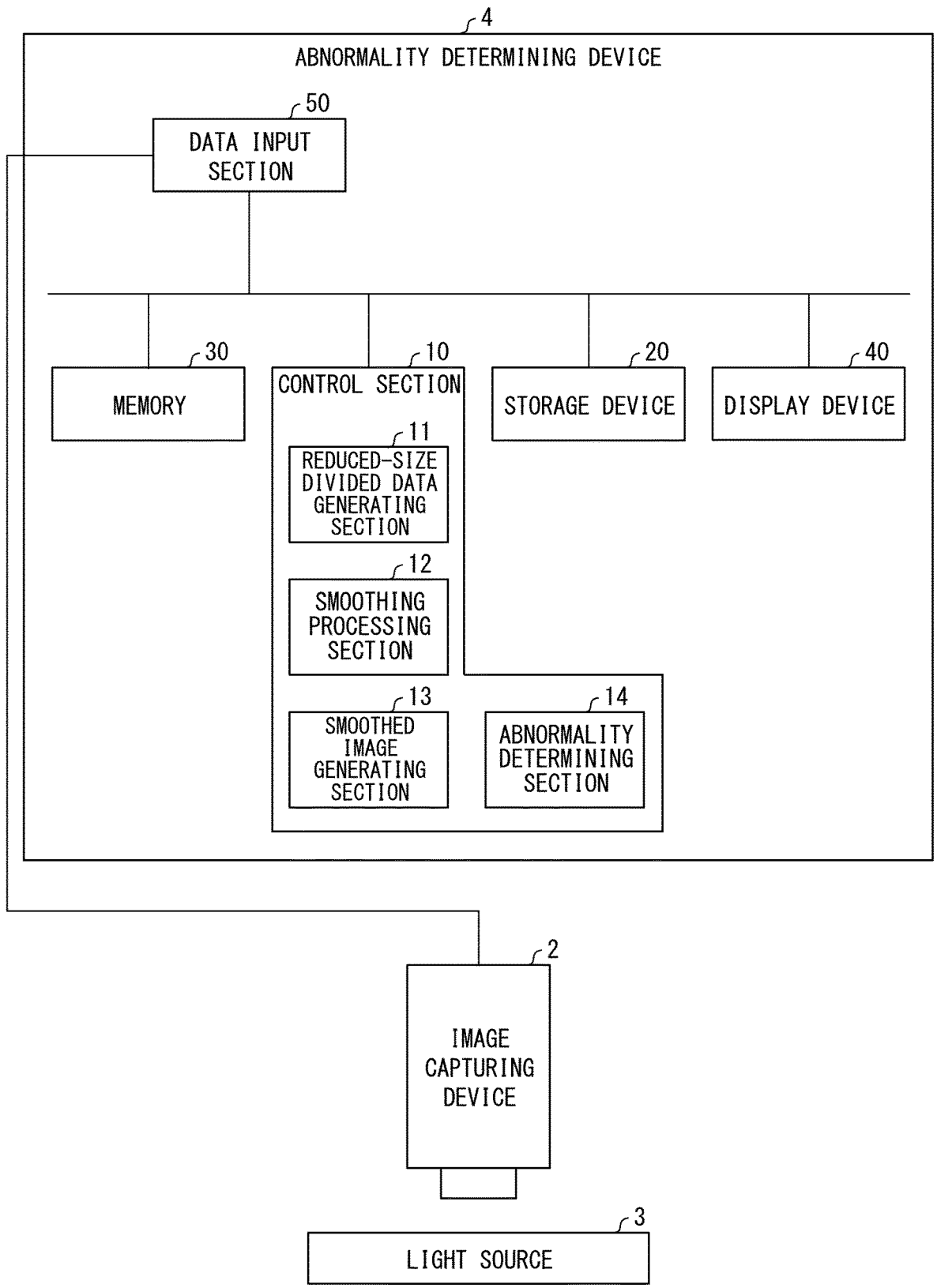
FIG. 13 is a block diagram illustrating an example configuration of a main part of an abnormality determining device in accordance with Embodiment 3 of the present invention.
Figure 14:
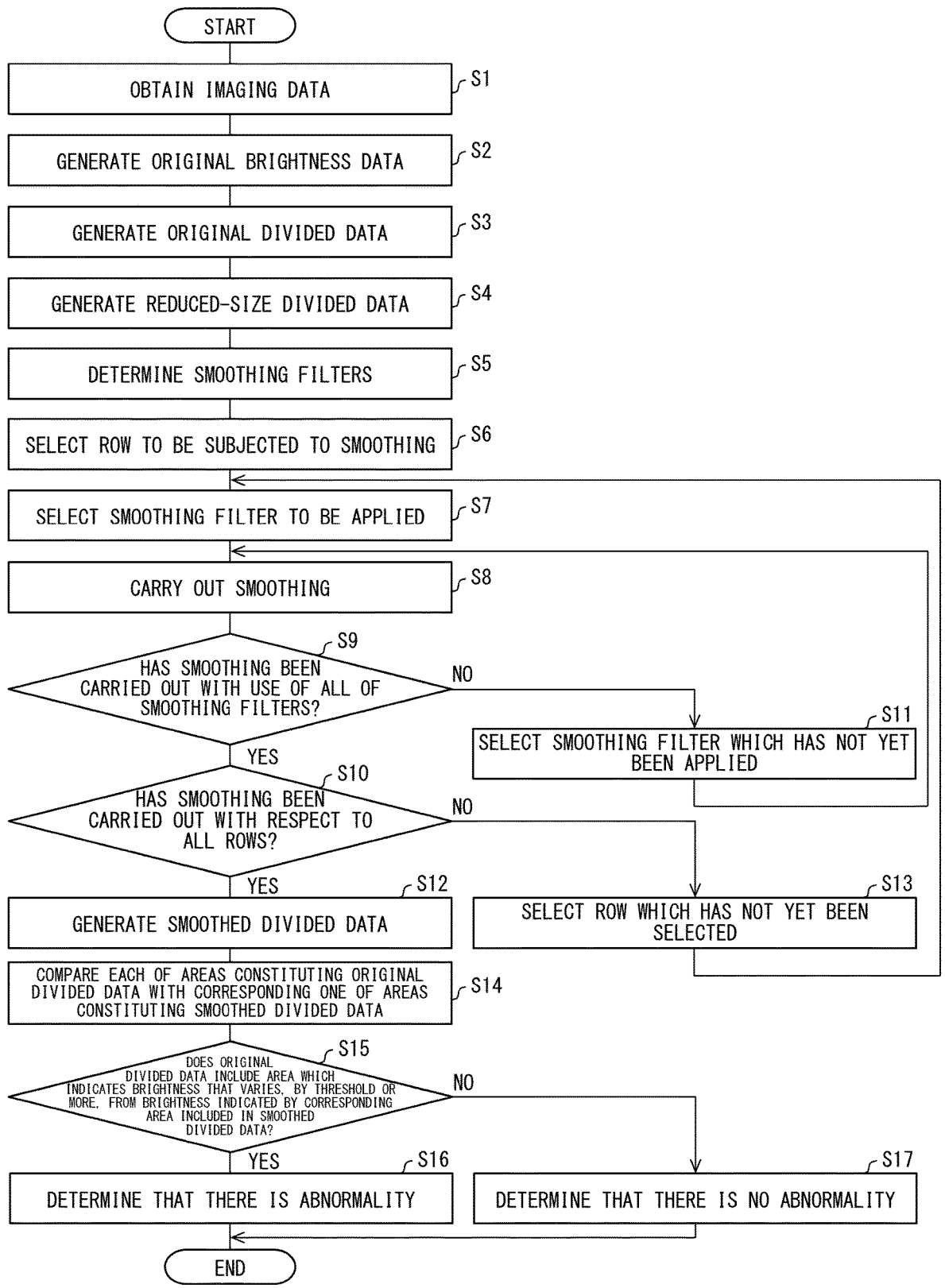
FIG. 14 is a flowchart illustrating an example flow of a process which is carried out by the abnormality determining device in accordance with Embodiment 3 of the present invention.

The following description will discuss Embodiment 3 of the present invention with reference to FIGS. 13 and 14. Note that, for convenience, a member having a function identical to that of a member described in Embodiment 1 or 2 will be given an identical reference numeral, and will not be described below.

(Configuration of Abnormality Determining Device)

A configuration of an abnormality determining device 4 in accordance with Embodiment 3 will be described below with reference to FIG. 13. The abnormality determining device 4 is basically identical, in configuration, to the smoothed image generating device 1 in accordance with each of Embodiments 1 and 2, but is different from the smoothed image generating device 1 in that a control section 10 of the abnormality determining device 4 further includes an abnormality determining section 14. The abnormality determining device 4 compares smoothed image data with divided data, each of which has been generated as in each of Embodiments 1 and 2, and determines whether or not an image capturing device 2 has an abnormality.

The abnormality determining section 14 compares smoothed divided data with original divided data, and determines whether or not the image capturing device 2 has an abnormality. The abnormality determining section 14 can be configured so as to (i) compare the smoothed divided data with the original divided data and (ii) determine that the image capturing device 2 has an abnormality, in a case where any one of a plurality of regions constituting the original divided data indicates brightness that is lower, by a threshold or more, than that indicated by a corresponding one of a plurality of regions constituting the smoothed divided data. For example, the abnormality determining section 14 can determine that the image capturing device 2 has an abnormality, in a case where brightness indicated by a specific area included in the original divided data is lower, by the threshold or more, than that indicated by a corresponding area included in the smoothed divided data.

(Flow of Process)

A flow of a process which is carried out by the abnormality determining device 4 in accordance with Embodiment 3 will be described below with reference to FIG. 14. FIG. 14 is a flowchart illustrating an example flow of the process which is carried out by the abnormality determining device 4.

The process carried out by the abnormality determining device 4 in accordance with Embodiment 3 is basically identical to but is partially different from that carried out by the smoothed image generating device 1 in Embodiment 1. In a case where a smoothed image generating section 13 generates smoothed divided data (smoothed image data) (S12), the abnormality determining section 14 compares each of a plurality of areas constituting original divided data with a corresponding one of a plurality of areas constituting the smoothed divided data so as to examine a variation in brightness which variation results from smoothing (S14). The abnormality determining section 14 then determines, as a result of comparison made in the step S14, whether or not the original divided data includes an area which indicates brightness that varies, by a threshold or more, from brightness indicated by a corresponding area included in the smoothed divided data (S15). In a case where the abnormality determining section 14 determines that the original divided data includes an area which indicates brightness that varies, by the threshold or more, from brightness indicated by a corresponding area included in the smoothed divided data (YES in S15), the abnormality determining section 14 determines that the image capturing device 2 has an abnormality (S16). In a case where the abnormality determining section 14 determines that the original divided data does not include an area which indicates brightness that varies, by the threshold or more, from brightness indicated by a corresponding area included in the smoothed divided data (NO in S15), the abnormality determining section 14 determines that the image capturing device 2 does not have an abnormality (S17).

The abnormality determining device 4 in accordance with Embodiment 3 thus compares, with original divided data, smoothed divided data which is generated by carrying out a smoothing process and an interpolating process with respect to reduced-size divided data, thereby determining whether or not the image capturing device 2 has an abnormality. This makes it possible to, for example, determine whether or not the image capturing device 2 is a defective device, in accordance with a result of determination made about whether or not the image capturing device 2 has an abnormality. Therefore, it is possible to rapidly generate smoothed divided data which is necessary to determine whether or not the image capturing device 2 has an abnormality.

[Variation]

In each of Embodiments 1 and 2, the smoothed image generating device 1 can be configured such that smoothed divided data (smoothed image data), generated by the smoothed image generating section 13, is compared with original divided data.

Furthermore, the smoothed image generating device 1 can be configured such that, in a case where it is detected that original divided data includes an area which indicates brightness that varies, by a given threshold or more, from brightness indicated by a corresponding area included in smoothed divided data, it can be determined that the image capturing device 2 has an abnormality. This makes it possible to detect an abnormality in a case where, for example, an optical system of the image capturing device 2 has a stain or the like which causes a variation in brightness.

[Software Implementation Example]

A control block (particularly, the reduced-size divided data generating section 11, the smoothing processing section 12, and the smoothed image generating section 13) of the smoothed image generating device 1 can be implemented by a logic circuit (hardware) provided on, for example, an integrated circuit (IC chip) or can be alternatively implemented by software.

In the latter case, the smoothed image generating device 1 includes a computer which executes instructions of a program that is software realizing the foregoing functions. The computer includes, for example, at least one processor (control device) and at least one computer-readable storage medium that stores the program therein. The object of an aspect of the present invention is attained by the at least one processor in the computer reading the program from the storage medium and executing the program. Examples of the at least one processor include central processing units (CPUs). Examples of the storage medium include "non-transitory tangible mediums" such as a tape, a disk, a card, a semiconductor memory, and a programmable logic circuit, as well as a read only memory (ROM). The computer can further include a random access memory (RAM) or the like in which the program is loaded. The program can be supplied to or made available to the computer via any transmission medium (such as a communication network or a broadcast wave) which allows the program to be transmitted. Note that an aspect of the present invention can also be attained in the form of a computer data signal in which the program is embodied via electronic transmission and which is embedded in a carrier wave.

[Recap]

A smoothed image generating device (1) in accordance with a first aspect of the present invention is a smoothed image generating device which generates smoothed image data, in which brightness is smoothed, from imaging data which an image capturing device has obtained by capturing a subject having uniform brightness, the smoothed image generating device including: a reduced-size divided data generating section (11) which generates reduced-size divided data by extracting some of a plurality of regions from divided data, the divided data being obtained by dividing, into the plurality of regions, brightness data obtained by extracting brightness information from the imaging data; a smoothing processing section (12) which generates smoothed reduced-size divided data by carrying out a smoothing process with respect to the reduced-size divided data; and a smoothed image generating section (13) which generates smoothed image data, which is identical in size to the divided data, by interpolating between a plurality of regions constituting the smoothed reduced-size divided data.

According to the above configuration, the smoothed image generating device carries out the smoothing process with respect to the reduced-size divided data which is smaller than the divided data. The smoothed image generating device then carries out an interpolating process with respect to data obtained by carrying out the smoothing process, and thereby generates the smoothed image data which is identical in size to the divided data. This makes it possible to generate the smoothed image data identical in size to the divided data, while reducing an amount of calculation required for smoothing as compared with a case where the smoothing process is applied to the divided data. Therefore, it is possible to provide a smoothed image generating device capable of rapidly smoothing brightness information.

The smoothed image generating device (1) in accordance with a second aspect of the present invention can be arranged such that, in the first aspect, the reduced-size divided data generating section (11) generates the reduced-size divided data by extracting every second region in a horizontal direction and in a vertical direction, out of the plurality of regions constituting the divided data.

According to the above configuration, the smoothed image generating device is capable of generating the smoothed image data with use of the reduced-size divided data which is obtained by extracting every second region in the horizontal direction and in the vertical direction from the divided data. This makes it possible to reduce, to approximately one fourth of the plurality of regions constituting the divided data, the number of regions which are subjected to the smoothing process.

The smoothed image generating device (1) in accordance with a third aspect of the present invention can be arranged such that, in the first aspect, the reduced-size divided data generating section (11) generates the reduced-size divided data by (i) dividing the divided data into three types of regions, a first one of which includes four regions including respective corners, a second one of which includes regions constituting an outer periphery, and a third one of which includes the other region, and (ii) extracting the some of the plurality of regions, constituting the divided data, by methods which are different between the three types of regions.

According to the above configuration, the smoothed image generating device is capable of generating the reduced-size divided data by extracting regions from each of the three types of regions into which the divided data is divided. This makes it possible to, for example, sets, in such extracted regions, brightness calculated by methods which are different between the three types of regions, and generate the reduced-size divided data.

The smoothed image generating device (1) in accordance with a fourth aspect of the present invention can be arranged such that, in any one of the first through third aspects, the smoothing processing section (12) carries out the smoothing process with use of a smoothing filter which causes the smoothing process to be carried out for each given range; and the smoothing process is a process in which the smoothing processing section (i) calculates a predictive value that predicts a value of brightness indicated by a region sandwiched between regions located at respective ends of the each given range, with use of values of brightness indicated by the respective regions located at the respective ends of the each given range, out of regions included in the each given range, and (ii) replaces, with the predictive value, the value of the brightness indicated by the region in a case where the value of the brightness indicated by the region is lower than the predictive value.

According to the above configuration, in a case where any of the plurality of regions constituting the divided data indicates brightness whose value is lower than a predictive value, the smoothed image generating device replaces the value of the brightness with the predictive value, thereby generating the smoothed image data. This makes it possible to carry out the smoothing process so that brightness becomes smooth at a high level.

The smoothed image generating device (1) in accordance with a fifth aspect of the present invention can be arranged such that, in the fourth aspect, the each given range includes vertically or horizontally arranged regions; and the smoothing processing section uses the smoothing filter which causes the predictive value to be calculated by linear interpolation with use of the values of the brightness indicated by the respective regions located at the respective ends of the each given range.

According to the above configuration, since the smoothing process is carried out with respect to the vertically or horizontally arranged regions with use of linear interpolation, it is possible to smooth brightness in the vertical or horizontal direction after the smoothing process.

The smoothed image generating device (1) in accordance with a sixth aspect of the present invention can be arranged such that, in any one of the first through fifth aspects, the smoothed image generating section generates the smoothed image data by (i) arranging, at respective locations corresponding to those in the divided data, the plurality of regions constituting the smoothed reduced-size divided data and (ii) setting brightness, calculated by linear interpolation, in each of blanks located between arranged regions.

According to the above configuration, the smoothed image generating device is capable of generating the smoothed divided data, which is identical in size to original brightness data, from the smoothed reduced-size divided data with use of linear interpolation.

An abnormality determining device (4) in accordance with a seventh aspect of the present invention is an abnormality determining device including: a smoothed image generating device (1) recited in any one of the first through sixth aspects; and an abnormality determining section (14) which compares smoothed image data with divided data, each of which is generated by the smoothed image generating device, and determines whether or not an image capturing device has an abnormality.

According to the above configuration, the abnormality determining device compares, with the divided data, the smoothed image data which is generated by carrying out the smoothing process and the interpolating process with respect to the reduced-size divided data, thereby determining whether or not the image capturing device has an abnormality. This makes it possible to, for example, determine whether or not the image capturing device is a defective device, in accordance with a result of determination made about whether or not the image capturing device has an abnormality. Thus, an abnormality determining device is provided which determines, with use of rapidly generated smoothed image data, whether or not the image capturing device has an abnormality.

A smoothed image generating method in accordance with an eighth aspect of the present invention is a smoothed image generating method of generating smoothed image data, in which brightness is smoothed, from imaging data which an image capturing device has obtained by capturing a subject having uniform brightness, the method including: a reduced-size divided data generating step (S4) of generating reduced-size divided data by extracting some of a plurality of regions from divided data, the divided data being generated with use of original brightness data obtained by extracting brightness information from the imaging data and being constituted by the plurality of regions each of which indicates adjusted brightness; a smoothing processing step (S8) of generating smoothed reduced-size divided data, in which entire brightness is smoothed, with use of a smoothing filter which causes a smoothing process to be carried out with respect to the reduced-size divided data; and a smoothed image generating step (S12) of generating smoothed image data, which is identical in size to the divided data, by interpolating between a plurality of regions constituting the smoothed reduced-size divided data. According to the above configuration, it is possible to bring about an effect similar to that brought about in the first aspect.

The smoothed image generating device in accordance with each aspect of the present invention can be realized by a computer. In this case, the scope of the present invention also encompasses (i) a control program for the smoothed image generating device, which control program causes a computer to serve as the smoothed image generating device by causing the computer to function as each section (software element) of the smoothed image generating device and (ii) a computer-readable storage medium in which the control program is stored.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Smoothed image generating device
10 Control section
11 Reduced-size divided data generating section
12 Smoothing processing section
13 Smoothed image generating section
14 Abnormality determining section
20 Storage device
30 Memory
40 Display device
50 Data input section
2 Image capturing device
3 Light source
4 Abnormality determining device
S4 Reduced-size divided data generating step
S8 Smoothing processing step
S12 Smoothed image generating step

The invention claimed is:
1. A smoothed image generating device which generates smoothed image data, in which brightness is smoothed, from imaging data which an image capturing device has obtained by capturing a subject having uniform brightness, the smoothed image generating device comprising:
a reduced-size divided data generating section which generates reduced-size divided data by extracting some of a plurality of regions from divided data, the divided data being obtained by dividing, into the plurality of regions, brightness data obtained by extracting brightness information from the imaging data;

a smoothing processing section which generates smoothed reduced-size divided data by carrying out a smoothing process with respect to the reduced-size divided data; and a smoothed image generating section which expands the smoothed reduced-size divided data into smoothed image data, which is identical in size to the divided data, and interpolates brightness between regions in which the regions constituting the smoothed reduced-size divided data are not arranged.

2. The smoothed image generating device as set forth in claim 1, wherein the reduced-size divided data generating section generates the reduced-size divided data by extracting every second region in a horizontal direction and in a vertical direction, out of the plurality of regions constituting the divided data.

3. The smoothed image generating device as set forth in claim 1, wherein the reduced-size divided data generating section generates the reduced-size divided data by (i) dividing the divided data into three types of regions, a first one of which includes four regions including respective corners, a second one of which includes regions constituting an outer periphery, and a third one of which includes the other region, and (ii) extracting the some of the plurality of regions, constituting the divided data, by methods which are different between the three types of regions.

4. A smoothed image generating device which generates smoothed image data, in which brightness is smoothed, from imaging data which an image capturing device has obtained by capturing a subject having uniform brightness, the smoothed image generating device comprising:

a reduced-size divided data generating section which generates reduced-size divided data by extracting some of a plurality of regions from divided data, the divided data being obtained by dividing, into the plurality of regions, brightness data obtained by extracting brightness information from the imaging data;

a smoothing processing section which generates smoothed reduced-size divided data by carrying out a smoothing process with respect to the reduced-size divided data; and a smoothed image generating section which generates smoothed image data, which is identical in size to the divided data, by interpolating between a plurality of regions constituting the smoothed reduced-size divided data, the smoothing processing section carrying out the smoothing process with use of a smoothing filter which causes the smoothing process to be carried out for each given range, and the smoothing process being a process in which the smoothing processing section (i) calculates a predictive value that predicts a value of brightness indicated by a region sandwiched between regions located at respective ends of the each given range, with use of values of brightness indicated by the respective regions located at the respective ends of the each given range, out of regions included in the each given range, and (ii) replaces, with the predictive value, the value of the brightness indicated by the region in a case where the value of the brightness indicated by the region is lower than the predictive value.

5. The smoothed image generating device as set forth in claim 4, wherein:

the each given range includes vertically or horizontally arranged regions; and the smoothing processing section uses the smoothing filter which causes the predictive value to be calculated by linear interpolation with use of the values of the brightness indicated by the respective regions located at the respective ends of the each given range.

6. The smoothed image generating device as set forth in claim 1, wherein the smoothed image generating section generates the smoothed image data by (i) arranging, at respective locations corresponding to those in the divided data, the plurality of regions constituting the smoothed reduced-size divided data and (ii) setting brightness, calculated by linear interpolation, in each of blanks located between arranged regions.

7. An abnormality determining device comprising:

a smoothed image generating device recited in claim 1; and an abnormality determining section which compares smoothed image data with divided data, each of which is generated by the smoothed image generating device, and determines whether or not an image capturing device has an abnormality.

8. A smoothed image generating method of generating smoothed image data, in which brightness is smoothed, from imaging data which an image capturing device has obtained by capturing a subject having uniform brightness, the method comprising:

a reduced-size divided data generating step of generating reduced-size divided data by extracting some of a plurality of regions from divided data, the divided data being generated with use of brightness data obtained by extracting brightness information from the imaging data and being constituted by the plurality of regions each of which indicates adjusted brightness;

a smoothing processing step of generating smoothed reduced-size divided data, in which entire brightness is smoothed, with use of a smoothing filter which causes a smoothing process to be carried out with respect to the reduced-size divided data; and a smoothed image generating step of expanding the smoothed reduced-size divided data into smoothed image data, which is identical in size to the divided data, and interpolating brightness between regions in which the regions constituting the smoothed reduced-size divided data are not arranged.

* * * * *